United States Patent
Ishikawa

(10) Patent No.: US 11,316,991 B2
(45) Date of Patent: Apr. 26, 2022

(54) IMAGE FORMING APPARATUS, INFORMATION PROCESSING METHOD, AND RECORDING MEDIUM

(71) Applicant: Tsuyoshi Ishikawa, Kanagawa (JP)

(72) Inventor: Tsuyoshi Ishikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/818,260

(22) Filed: Mar. 13, 2020

(65) Prior Publication Data

US 2020/0304661 A1 Sep. 24, 2020

(30) Foreign Application Priority Data

Mar. 20, 2019 (JP) .............................. JP2019-052361

(51) Int. Cl.
  *G06F 3/12* (2006.01)
  *H04N 1/00* (2006.01)
  *G06K 15/02* (2006.01)
(52) U.S. Cl.
  CPC ....... *H04N 1/00482* (2013.01); *G06F 3/1205* (2013.01); *G06F 3/1208* (2013.01); *G06F 3/1253* (2013.01); *H04N 1/00456* (2013.01); *H04N 1/00466* (2013.01)
(58) Field of Classification Search
  None
  See application file for complete search history.

(56) References Cited

U.S. PATENT DOCUMENTS

| | | | |
|---|---|---|---|
| 10,109,092 B1 * | 10/2018 | Hitchings, Jr. | G06T 11/60 |
| 2005/0008387 A1 * | 1/2005 | Sato | G06K 15/00 399/81 |
| 2006/0275066 A1 * | 12/2006 | Mima | B41J 11/009 400/76 |
| 2007/0058189 A1 * | 3/2007 | Yaguchi | G06F 3/1256 358/1.13 |
| 2007/0076235 A1 * | 4/2007 | Murata | H04N 1/00482 358/1.13 |
| 2010/0023856 A1 * | 1/2010 | Hoshino | G03G 15/502 715/274 |

(Continued)

FOREIGN PATENT DOCUMENTS

| | | |
|---|---|---|
| JP | 2003-011471 | 1/2003 |
| JP | 2008-154416 | 6/2006 |
| JP | 2009-182915 | 8/2009 |

*Primary Examiner* — Beniyam Menberu
(74) *Attorney, Agent, or Firm* — Harness, Dickey & Pierce, P.L.C.

(57) ABSTRACT

An image forming apparatus according to an embodiment of the present disclosure includes a memory and a hardware processor coupled to the memory. The hardware processor is configured to: cause a display device to display a setting screen for receiving individual setting values for a plurality of setting items; receive, from a user, individual setting values for a first item, a second item, and a third item in the setting items through the setting screen; specify a recommended setting value for the third item, based on the received setting values for the first item and the second item; and control, upon receiving the setting values for the first item and the second item from the user, display of information for receiving a setting value for the third item included in the setting screen based on the recommended setting value.

14 Claims, 13 Drawing Sheets

(56) References Cited

U.S. PATENT DOCUMENTS

| | | | |
|---|---|---|---|
| 2010/0265547 A1* | 10/2010 | Katou | H04N 1/0035 |
| | | | 358/1.16 |
| 2011/0002014 A1* | 1/2011 | Tani | H04N 1/0035 |
| | | | 358/403 |
| 2012/0212763 A1* | 8/2012 | Honma | G06F 3/1226 |
| | | | 358/1.13 |
| 2012/0224222 A1* | 9/2012 | Kinoshita | G06F 3/1205 |
| | | | 358/1.15 |
| 2014/0009776 A1* | 1/2014 | Suzuki | H04N 1/00108 |
| | | | 358/1.13 |
| 2014/0280795 A1* | 9/2014 | Mori | H04L 41/0869 |
| | | | 709/220 |
| 2015/0227327 A1* | 8/2015 | Akiyama | G06F 3/1254 |
| | | | 358/1.15 |
| 2016/0065766 A1* | 3/2016 | Miyamoto | H04N 1/00506 |
| | | | 358/1.13 |

* cited by examiner

IMAGE FORMING APPARATUS, INFORMATION PROCESSING METHOD, AND RECORDING MEDIUM

CROSS-REFERENCE TO RELATED APPLICATIONS

The present application claims priority under 35 U.S.C. § 119 to Japanese Patent Application No. 2019-052361, filed on Mar. 20, 2019. The contents of which are incorporated herein by reference in their entirety.

BACKGROUND OF THE INVENTION

1. Field of the Invention

The present invention relates to an image forming apparatus, an information processing method, and a recording medium.

2. Description of the Related Art

Conventionally, a multifunction peripheral that has a scan function, a print function, a staple function, and a punch function has been known.

Japanese Unexamined Patent Application Publication No. 2009-182915 discloses a multifunction peripheral that receives setting values for the setting items for double-sided printing, aggregate printing, stapling, punching, and the like, through a screen. The multifunction peripheral disclosed in the above-mentioned literature executes processes such as double-sided printing, aggregate printing, stapling, and punching, according to the setting values received for the setting items.

When the multifunction peripheral such as the above is used to, for example, staple or punch the sheets of paper on which double-sided printing and aggregate printing are performed, the user is required to set the binding position by taking into an account the opening direction of the double-sided printed sheets, and a combination of aggregate number and arrangement direction of images in the aggregate printing. Similarly, the user needs to determine the setting value for the other setting item, by taking into an account a combination of the setting values for two setting items relating to image forming. Thus, a significant burden has been placed on the user.

SUMMARY OF THE INVENTION

An image forming apparatus according to one aspect of the present invention includes a memory and a hardware processor coupled to the memory. The hardware processor is configured to: cause a display device to display a setting screen for receiving individual setting values for a plurality of setting items; receive, from a user, individual setting values for a first item, a second item, and a third item in the setting items through the setting screen; specify a recommended setting value for the third item, based on the received setting values for the first item and the second item; and control, upon receiving the setting values for the first item and the second item from the user, display of information for receiving a setting value for the third item included in the setting screen based on the recommended setting value.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
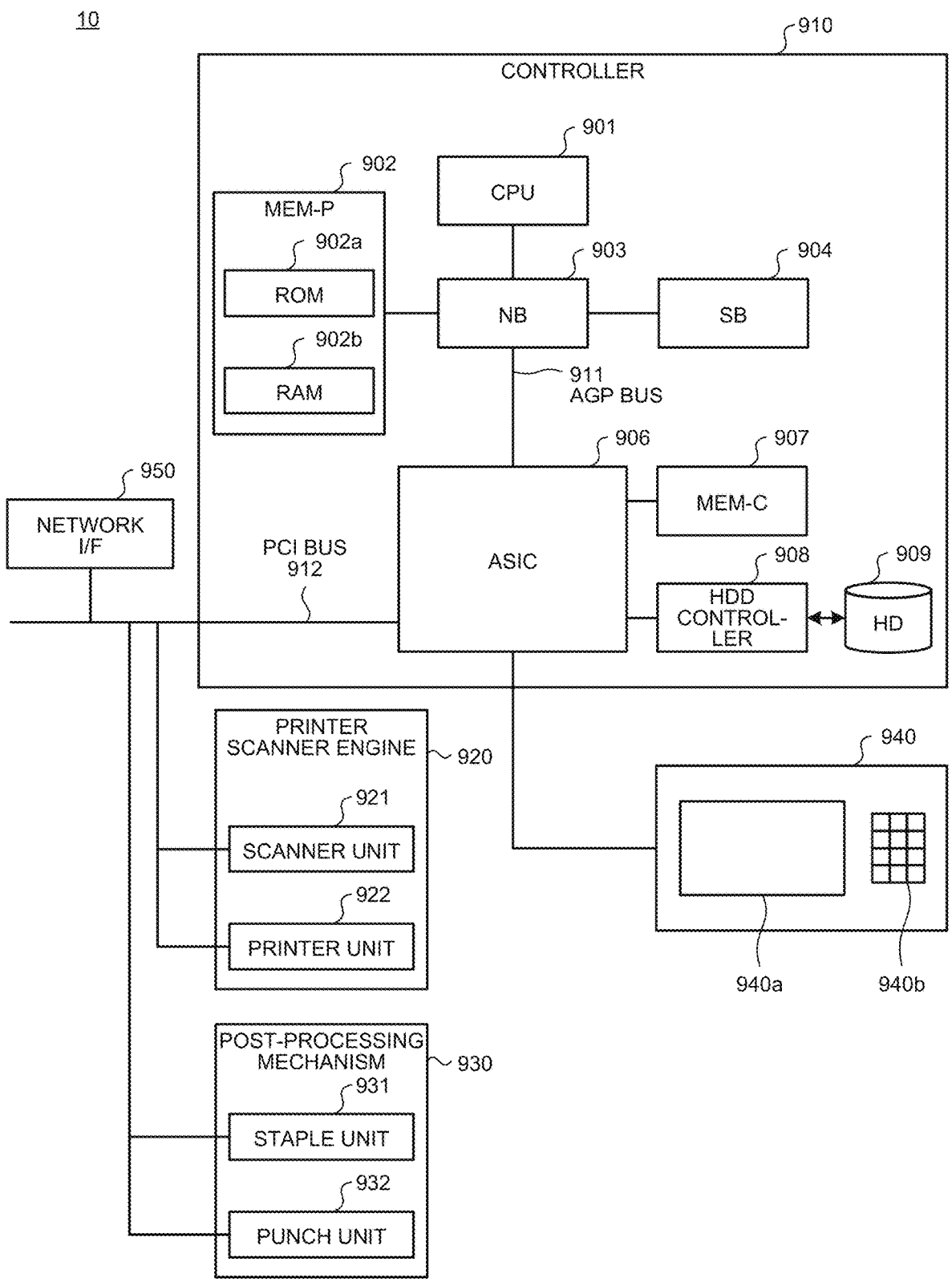
FIG. 1 is a diagram illustrating a hardware configuration of a multifunction peripheral 10 according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention is directed to providing an image forming apparatus, an information processing method, and a recording medium that can reduce the burden of the user.

Hereinafter, a multifunction peripheral 10 of an embodiment according to the present invention will be described in detail with reference to the accompanying drawings. Note that the present invention is not limited to the embodiment.

The multifunction peripheral 10 according to the embodiment is an example of an image forming apparatus that forms an image on a sheet of paper. The multifunction peripheral 10 may also be referred to as a multifunction peripheral/product/printer (MFP).

The multifunction peripheral 10 according to the embodiment has a scanner function for reading out an image printed on an original document, and a print function for printing the read image on a sheet of paper. Moreover, the multifunction peripheral 10 according to the embodiment has a function for executing post-processing on one or more sheets of paper on which the image is printed. For example, as the post-processing function, the multifunction peripheral 10 has a staple function for stapling one or more sheets of paper on which an image is printed, using a stapler. For example, as the post-processing function, the multifunction peripheral 10 has a punch function for punching a hole on one or more sheets of paper on which an image is printed to bind one or more sheets of paper, with a string or the like. Furthermore, the multifunction peripheral 10 may also have other functions such as a communication function, a facsimile function, and an information processing function.

FIG. 1 is a diagram illustrating a hardware configuration of the multifunction peripheral 10 according to the embodiment. The multifunction peripheral 10 includes a controller 910, a printer scanner engine 920, a post-processing mechanism 930, an operation panel 940, and a network interface (I/F) 950.

The controller 910 controls the entire multifunction peripheral 10. For example, the controller 910 controls the entire multifunction peripheral 10 so that the multifunction peripheral 10 is operated on the basis of the setting values set for a plurality of setting items.

The controller 910 includes a central processing unit (CPU) 901 that is the main unit of a computer, a system memory (MEM-P) 902, a North bridge (NB) 903, a South bridge (SB) 904, an application specific integrated circuit (ASIC) 906, a local memory (MEM-C) 907 that is a storage unit, a hard disk drive (HDD) controller 908, and a hard disk (HD) 909 that is a storage unit. The North bridge 903 and the ASIC 906 are connected by an accelerated graphics port (AGP) bus 911.

The CPU 901 controls the entire multifunction peripheral 10. The North bridge 903 is a bridge for connecting the CPU 901, the system memory 902, the South bridge 904, and the AGP bus 911. The North bridge 903 includes a memory controller that controls reading from and writing to the system memory 902, a peripheral component interconnect (PCI) master, and an AGP target.

The system memory 902 includes a read-only memory (ROM) 902*a* that is a memory used for storing a computer program and data for implementing the functions of the controller 910. The system memory 902 also includes a random-access memory (RAM) 902*b* used to develop a computer program and data, used as an image drawing memory for printing memory, and the like. The computer program stored in the RAM 902*b* may be recorded in a computer-readable recording medium such as a compact disc-read only memory (CD-ROM), a compact disc-recordable (CD-R), and a digital versatile disc (DVD), in an installable or executable file format.

The South bridge 904 is a bridge for connecting the North bridge 903 to a PCI device and a peripheral device.

The ASIC 906 is an integrated circuit (IC) used for image processing including a hardware element for image processing. The ASIC 906 serves as a bridge for connecting the AGP bus 911, a PCI bus 912, the HDD controller 908, and the local memory 907. The ASIC 906 includes a PCI target, an AGP master, an arbiter (ARB) that is the core of the ASIC 906, a memory controller for controlling the local memory 907, a plurality of direct memory access controllers (DMACs), and a PCI unit. Each of the direct memory access controllers (DMACs) rotates image data and the like by hardware logic and the like. The PCI unit transfers data between the printer scanner engine 920 and the post-processing mechanism 930 via the PCI bus 912.

An interface of a universal serial bus (USB), and an interface of Institute of Electrical and Electronics Engineers (IEEE) 1394 may also be connected to the ASIC 906.

The local memory 907 is a memory used as an image buffer and a code buffer for copying. The HD 909 is a storage device for accumulating image data, accumulating font data used for printing, and accumulating forms. The HDD controller 908 controls reading or writing data from or to the HD 909 based on the control performed by the CPU 901.

The AGP bus 911 is a bus interface for graphics accelerator card developed to increase the speed of graphics processing. By directly accessing the system memory 902 at a high throughput, the AGP bus 911 can increase the speed of the graphics accelerator card.

The printer scanner engine 920 is a hardware mechanism for implementing the scanner function and the printer function. The printer scanner engine 920 includes a scanner unit 921 and a printer unit 922. The scanner unit 921 and the printer unit 922 operate according to the control performed by the controller 910. On the basis of the setting value received from the controller 910, the scanner unit 921 captures an image printed on a sheet of paper, and generates image data. The printer unit 922 forms an image on the sheet of paper, on the basis of the setting value received from the controller 910. A control circuit in the scanner unit 921 and the printer unit 922 exchanges information with the controller 910 via the PCI bus 912.

The post-processing mechanism 930 is a hardware mechanism for implementing a post-processing function. For example, the post-processing mechanism 930 is a hardware mechanism for implementing a staple function and a punch function. In the present embodiment, the post-processing mechanism 930 includes a staple unit 931 and a punch unit 932. The staple unit 931 and the punch unit 932 operate according to the control performed by the controller 910. On the basis of the setting value received from the controller 910, the staple unit 931 binds one or more sheets of paper on which an image is printed by the printer unit 922, using a stapler. On the basis of the setting value received from the controller 910, the punch unit 932 punches a punch hole on one or more sheets of paper on which an image is printed by the printer unit 922, for binding one or more sheets of paper with a string or the like. A control circuit in the staple unit 931 and the punch unit 932 exchanges information with the controller 910 via the PCI bus 912.

The operation panel 940 includes a display unit 940*a* (a display device), such as a touch panel. The display unit 940*a* can display information to a user and that can receive operation information from the user. The display unit 940*a* displays information according to the control performed by the controller 910, and transmits the operation information received from the user to the controller 910.

The display unit 940*a* displays a setting screen for receiving a setting value supplied by the user, for each setting item, in accordance with the control performed by the controller 910. The setting screen may also include option information to let the user select one setting value from a plurality of acceptable setting values for each of the setting items. Moreover, the setting screen may also include information to highlight one or more recommended setting values recommended to the user, among the acceptable setting values.

Moreover, the setting screen may also include information to let the user identify the current setting value (for example, a default setting value). Furthermore, the setting screen may also include a start key for receiving a copy start instruction.

The operation panel 940 also includes an operation key 940*b* for receiving an operation from the user. The operation key 940*b* includes a numeric keypad for receiving a setting value in the form of a numeric value, a start key for receiving a copy start instruction, and the like. The operation panel 940 transmits the setting value and the operation information supplied to the display unit 940*a* by the user, and the setting value and the operation information supplied to the operation key 940*b* by the user, to the controller 910.

The network I/F 950 is an interface for communicating data by using a communication network. The network I/F 950 exchanges information with the controller 910 via the PCI bus 912.

Such a multifunction peripheral 10 switches the function to be executed, using an application switching key of the operation panel 940. For example, the multifunction peripheral 10 switches the function to be executed to one of a document box function, a copy function, a printer function, and a facsimile function.

Figure 2:
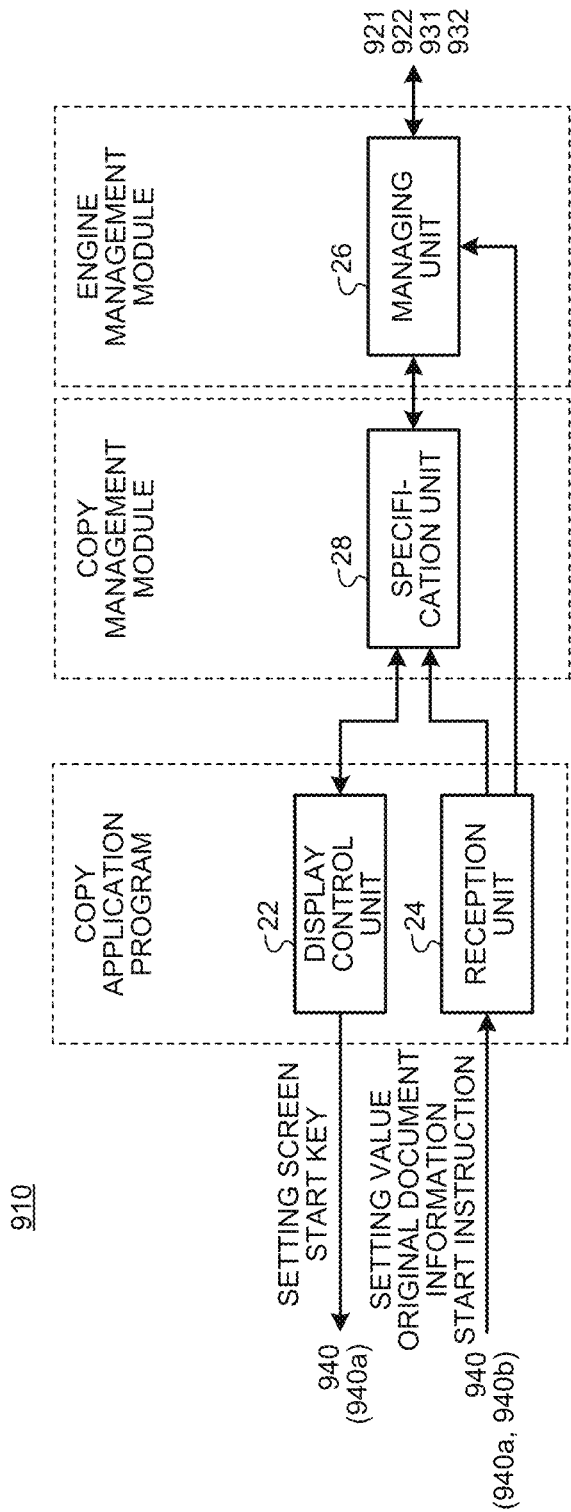
FIG. 2 is a diagram illustrating a functional configuration of a controller 910 according to the embodiment.

FIG. 2 is a diagram illustrating a functional configuration of the controller 910 according to the embodiment. In a case where the multifunction peripheral 10 executes the copy function, the controller 910 activates a display control unit 22, a reception unit 24, a managing unit 26, and a specification unit 28.

When the CPU 901 executes a copy application program, the controller 910 functions as the display control unit 22 and the reception unit 24. Moreover, for example, when the CPU 901 executes a copy management module, the controller 910 functions as the specification unit 28. Furthermore, for example, when the CPU 901 executes an engine management module, the controller 910 functions as the managing unit 26.

The display control unit 22 causes the display unit 940*a* of the operation panel 940 to display the setting screen for receiving, from the user, individual setting values for the setting items relating to the copy function, from the user. The setting screen is not limited to a piece of screen data, but may also be implemented by a combination of a plurality of pieces of screen data that transit by a button and the like, for example.

The display control unit 22 includes, into the setting screen, information for receiving the setting value for each setting item. For example, the display control unit 22 acquires, for each setting item, the setting value acceptable by the multifunction peripheral from the specification unit 28. Then, the display control unit 22 includes, into the setting screen, option information to let the user select one of the acceptable setting values for each setting item. By operating the display unit 940*a* or the operation key 940*b*, the user can select a setting value from the option information included in the setting screen, for each setting item.

The setting items relating to the copy function include, for example, a setting item for double-sided printing, a setting item for aggregate printing, a setting item for stapling or punching, or the like.

For the setting item for double-sided printing, the setting screen includes option information to let the user select one of a setting value indicating to perform single-sided printing, a setting value indicating to perform double-sided printing that opens left and right, and a setting value indicating to perform double-sided printing that opens up and down. Moreover, for the setting item for aggregate printing, the setting screen includes option information to let the user select one of a setting value indicating to include a single image in a sheet of paper, and a plurality of setting values indicating combinations of aggregate number and arrangement direction of images to be included in a sheet of paper. Furthermore, for the setting item for stapling or punching, the setting screen includes option information to let the user select one of a setting value indicating not to staple or punch the sheet of paper, and a plurality of setting values indicating the positions to be stapled or to be punched.

Moreover, the setting screen may also be a screen for receiving original document information relating to the original document from the user. For example, the setting screen includes option information to let the user select whether the original document is portrait or landscape. Moreover, the setting screen also includes option information to let the user select whether the original document is single-sided printed, double-sided printed that opens left and right, or double-sided printed that opens up and down.

Furthermore, the display control unit 22 may also display a start key for receiving a copy start instruction from the user, on the display unit 940*a*.

The reception unit 24 receives the setting value for each of the setting items relating to the copy function from the user, through the setting screen. For example, the reception unit 24 receives a single setting value selected from the option information, for each of the setting items.

The reception unit 24 receives the setting value for the setting item for double-sided printing, the setting value for the setting item for aggregate printing, and the setting value for the setting item for stapling or punching, through the setting screen. For the setting item for double-sided printing, the reception unit 24 receives one of the setting values indicating to perform single-sided printing, the setting value indicating to perform double-sided printing that opens left and right, and the setting value indicating to perform double-sided printing that opens up and down. Moreover, for the setting item for aggregate printing, the reception unit 24 receives one of the setting value indicating to include a single image in a sheet of paper, and the setting values indicating combinations of aggregate number and arrangement direction of images to be included in a sheet of paper. Furthermore, for the setting item for stapling or punching, the reception unit 24 receives one of the setting value indicating not to staple or punch the sheet of paper, or the setting values indicating the positions to be stapled or to be punched.

Moreover, the reception unit 24 may also receive original document information relating to the original document from the user, through the setting screen. For example, the reception unit 24 may also receive original document direction information representing whether the original document is portrait or landscape from the user through the setting screen, as the original document information. Furthermore, the reception unit 24 may also receive original document double-sided printing information representing whether the original document is printed single-sided, printed double-sided that opens left and right, or printed double-sided that opens up and down from the user through the setting screen, as the original document information.

Still furthermore, the reception unit 24 receives a copy start instruction from the operation panel 940. For example, when the start key included in the operation key 940*b* in the operation panel 940 is operated, or when the start key displayed on the display unit 940*a* is operated, the reception unit 24 receives the copy start instruction. Upon receiving the copy start instruction, the reception unit 24 supplies the managing unit 26 with a copy start command, in addition to the setting values for the setting items relating to the copy function.

The managing unit 26 controls the operations of the scanner unit 921, the printer unit 922, the staple unit 931, and the punch unit 932.

Upon acquiring the copy start command from the reception unit 24, the managing unit 26 supplies the scanner unit 921 with a scan start instruction. In this case, the managing unit 26 supplies the scanner unit 921 with the setting value for the setting item relating to the scanner function among the setting items relating to the copy function. On the basis of the received setting value, the scanner unit 921 scans the document and captures the image. The managing unit 26 acquires image data indicating the captured image from the scanner unit 921.

After acquiring the image data from the scanner unit 921, the managing unit 26 supplies the printer unit 922 with the captured image data and a printing start instruction. In this case, the managing unit 26 supplies the printer unit 922 with the setting value for the setting item relating to the printer function, among the setting items relating to the copy function. The printer unit 922 forms an image on a sheet of paper, on the basis of the supplied setting value and image data.

Moreover, in the setting items relating to the copy function, when the staple function is set to be operated, the managing unit 26 supplies the staple unit 931 with a staple start instruction, after the printer unit 922 has finished the process. In this case, the managing unit 26 supplies the staple unit 931 with the setting value for the setting item relating to the staple function. On the basis of the supplied setting value, the staple unit 931 binds one or more sheets of paper using a stapler.

Furthermore, in the setting items relating to the copy function, when the punch function is set to be operated, the managing unit 26 supplies the punch unit 932 with a punch start instruction, after the printer unit 922 has finished the process. In this case, the managing unit 26 supplies the punch unit 932 with the setting value for the setting item relating to the punch function. On the basis of the supplied setting value, the punch unit 932 opens a punch hole on one or more sheets of paper.

Still furthermore, when the execution of the copy function is started in the multifunction peripheral 10, the managing unit 26 acquires information representing the functions that can be executed by the scanner unit 921, the printer unit 922, the staple unit 931, and the punch unit 932 therefrom. The managing unit 26 generates list information in which pieces of information representing the executable functions obtained from the scanner unit 921, the printer unit 922, the staple unit 931, and the punch unit 932 are collected. The managing unit 26 then supplies the specification unit 28 with the list information.

The specification unit 28 acquires the list information of executable copy function from the managing unit 26. On the basis of the acquired list information, the specification unit 28 generates a plurality of acceptable setting values for each of the setting items relating to the copy function. The specification unit 28 then supplies the display control unit 22 with the acceptable setting values for the setting items.

In the above process, among the setting items relating to the copy function, the reception unit 24 receives the setting value for each of predetermined first, second, and third items from the user through the setting screen. In this case, the specification unit 28 specifies the recommended setting value for the third item, on the basis of the received setting values for the first item and the second item.

Moreover, the reception unit 24 may also receive the original document information relating to the original document from the user through the setting screen. In this case, the specification unit 28 may also specify the recommended setting value, on the basis of the original document information.

The recommended setting value is a setting value among the acceptable setting values for the third item, which is suitable in a case where an image is formed on the sheet of paper by the setting values for the first item and the second item. For example, the recommended setting value is a setting value that allows the user to refer to the image without contradiction, among the acceptable setting values for the third item, when an image is formed on the sheet of paper by the setting values for the first item and the second item. For example, to be able to "refer to the image without contradiction" in the above sentence means that, in the case of forming an image by the setting values, the display sequence of the images is the same as that of the original image, directions of all the images are the same as those of the original image, and the like.

Upon receiving the setting values for the first item and the second item from the user, the display control unit 22 controls the display of information for receiving the setting value for the third item included in the setting screen, on the basis of the recommended setting value. Consequently, the display control unit 22 can let the user identify the recommended setting value for the third item, and reduce the input burden of the user.

For example, as the information for receiving the setting value for the third item, the display control unit 22 includes option information to let the user select one of the acceptable setting values for the third item, in the setting screen. Then, upon receiving the setting values for the first item and the second item, the display control unit 22 highlights the option to let the user select the recommended setting value included in the option information.

For example, the option information may also include the acceptable setting values for the third item that are arranged in a list form and from which one is selected. In this case, the display control unit 22 highlights the recommended setting value in the option information.

Moreover, for example, the option information may also include a preview image representing a sheet of paper after being printed, and a plurality of selection marks provided at the positions corresponding to the acceptable setting values for the third item, in the preview image. In this case, the display control unit 22 highlights the selection mark at the position corresponding to the recommended setting value, among the selection marks.

In this manner, by highlighting the option to let the user select the recommended setting value, the display control unit 22 can let the user easily select a suitable setting value (setting value that allows the user to refer to the image without contradiction). Moreover, the user can also select the setting value other than the recommended setting value. Consequently, when the user wishes to select an unsuitable setting value, the display control unit 22 can let the user select the setting value corresponding to the user's preference.

More specifically, the first item and the second item may be the setting item for double-sided printing and the setting item for aggregate printing, and the third item may be the setting item for stapling or punching. In this case, on the basis of the setting value for the setting item for double-sided printing and the setting value for the setting item for aggregate printing, the specification unit 28 specifies the recommended setting value for the setting item for stapling or punching. For example, as the recommended setting value for the setting item for stapling or punching, the specification unit 28 specifies the position at which the images can be referred to in the page order of the original document, when the sheets of paper printed using the received setting value are bound together.

Moreover, for example, the first item and the second item may be the setting item for stapling or punching and the setting item for double-sided printing, and the third item may be the setting item for aggregate printing. In this case, on the basis of the setting value for the setting item for stapling or punching and the setting value for the setting item for double-sided printing, the specification unit 28 specifies the recommended setting value for the setting item for aggregate printing. For example, as the recommended setting value for the setting item for aggregate printing, the specification unit 28 specifies a combination of aggregate number and arrangement direction of images with which the images can be referred to in the page order of the original document, when the sheets of paper printed using the received setting value are bound together.

Furthermore, for example, the first item and the second item may be the setting item for stapling and punching and the setting item for aggregate printing, and the third item may be the setting item for double-sided printing. In this case, on the basis of the setting value for the setting item for stapling or punching and the setting value for the setting item for aggregate printing, the specification unit 28 specifies the recommended setting value for the setting item for double-sided printing. For example, as the recommended setting value for the setting item for double-sided printing, the specification unit 28 specifies the direction of double-sided opening with which images can be referred to in the page order of the original document, when the sheets of paper printed using the received setting value are bound together.

Figure 3:
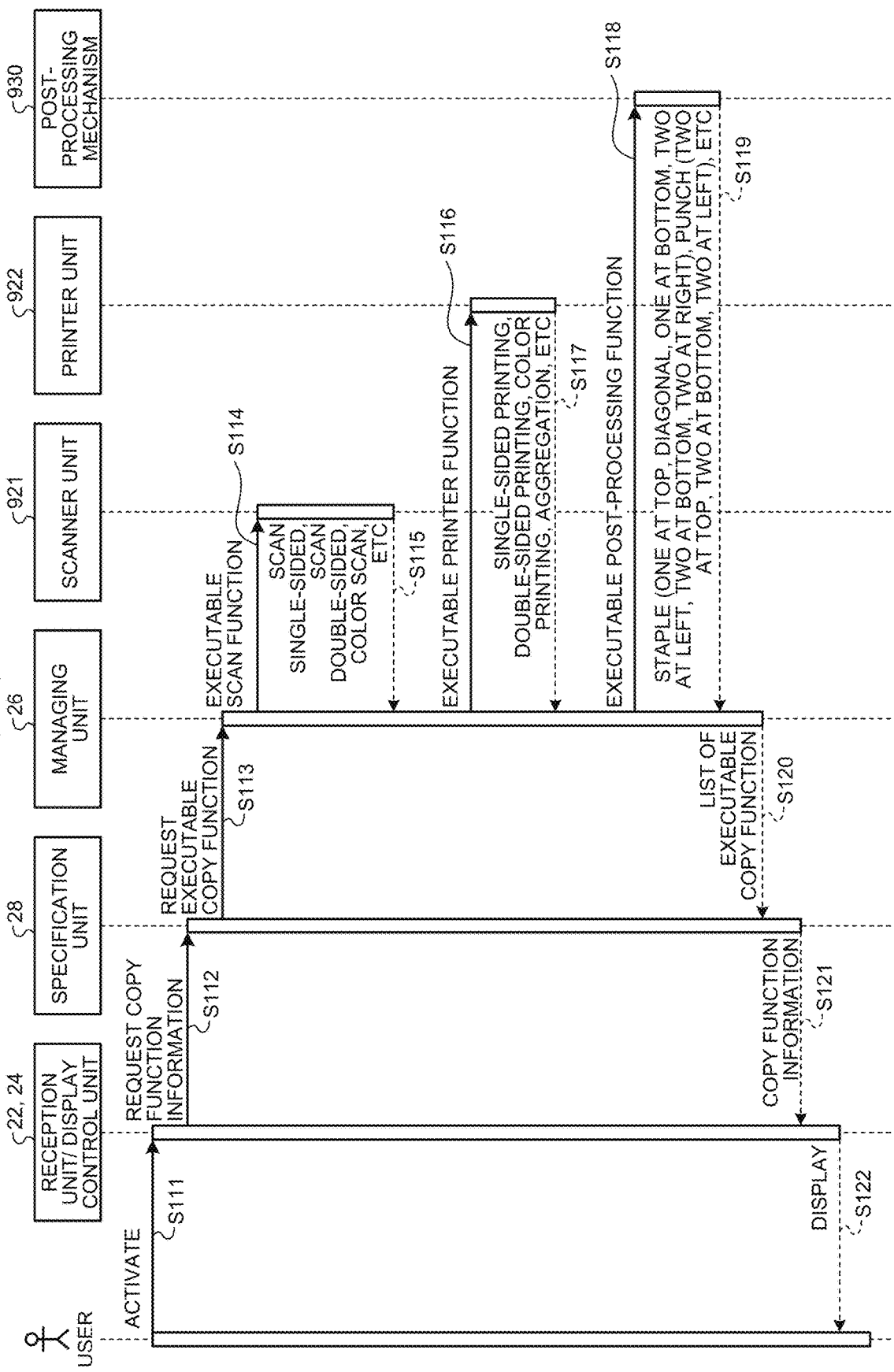
FIG. 3 is a sequence diagram illustrating a flow of processing performed by the multifunction peripheral 10, when a copy function is started.

FIG. 3 is a sequence diagram illustrating a flow of processing performed by the multifunction peripheral 10, when the copy function is started. When the copy function is selected, the multifunction peripheral 10 executes the process flow as illustrated in FIG. 3.

First, at S111, the user operates the operation panel 940 to give an instruction to activate the copy function. Then, at S112, the reception unit 24 requests copy function information from the specification unit 28. Then, at S113, the specification unit 28 requests a notification of an executable copy function from the managing unit 26.

Then, at S114, the managing unit 26 requests a notification of the executable scan function form the scanner unit 921. Then, at S115, the scanner unit 921 notifies the managing unit 26 of the executable scanner function in response to the request. For example, the scanner unit 921 notifies that the scanner unit 921 can scan single-sided, can scan double-sided, can color scan, and the like.

Then, at S116, the managing unit 26 requests a notification of an executable printer function from the printer unit 922. Then, at S117, the printer unit 922 notifies the managing unit 26 of executable printer function in response to the request. For example, the printer unit 922 notifies that the printer unit 922 can perform single-sided printing, can perform double-sided printing, can perform color printing, can perform aggregate printing, and the like.

Then, at S118, the managing unit 26 requests a notification of an executable function from the post-processing mechanism 930. Then, at S119, the post-processing mechanism 930 notifies the managing unit 26 of the executable post-processing function in response to the request. For example, the post-processing mechanism 930 notifies that the post-processing mechanism 930 can staple at one place at the top, in a diagonal manner, one place at the bottom, two places at the left, two places at the bottom, and two places at the right. The post-processing mechanism 930 also notifies that the post-processing mechanism 930 can punch at two places at the top, two places at the bottom, and two places at the left.

Then, at S120, the managing unit 26 notifies the specification unit 28 of the list information of the executable copy function. Then, at S121, the specification unit 28 notifies the display control unit 22 of copy function information representing the executable copy function. Then, at S122, the display control unit 22 generates the setting screen for receiving the setting values for the setting items relating to the copy function from the user, and causes the display unit 940a to display the generated setting screen.

Figure 4:
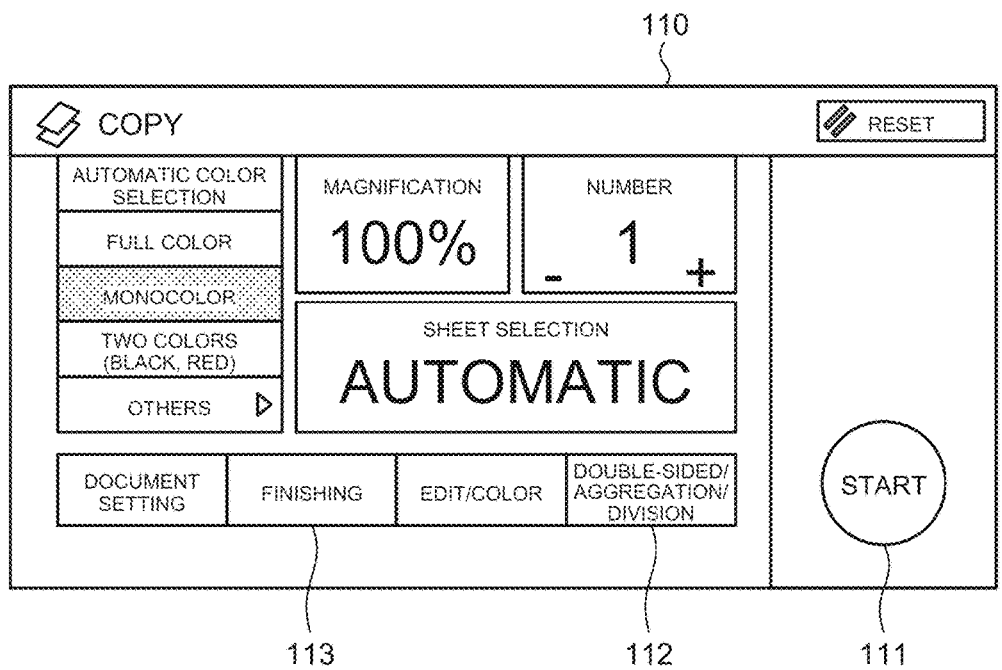
FIG. 4 is a diagram illustrating a main setting screen 110.

FIG. 4 is a diagram illustrating a main setting screen 110. As an example of the setting screen, the display control unit 22 causes the display unit 940a to display the main setting screen 110 as illustrated in FIG. 4.

The main setting screen 110 includes a start key button 111. The start key button 111 is an operation button for receiving a copy start instruction from the user. When the user presses the start key button 111, the reception unit 24 supplies the managing unit 26 with a copy start command.

Moreover, the main setting screen 110 includes a double-sided/aggregation/division button 112. The double-sided/aggregation/division button 112 is a button for transiting the screen to a double-sided/aggregation/division setting screen 120 (details will be described in FIG. 5). When the user presses the double-sided/aggregation/division button 112, the display control unit 22 causes the display unit 940a to display the double-sided/aggregation/division setting screen 120.

Moreover, the main setting screen 110 includes a finishing button 113. The finishing button 113 is a button for transiting the screen to a finishing screen 130 (details will be described in FIG. 6). When the user presses the finishing button 113, the display control unit 22 causes the display unit 940a to display the finishing screen 130.

Figure 5:
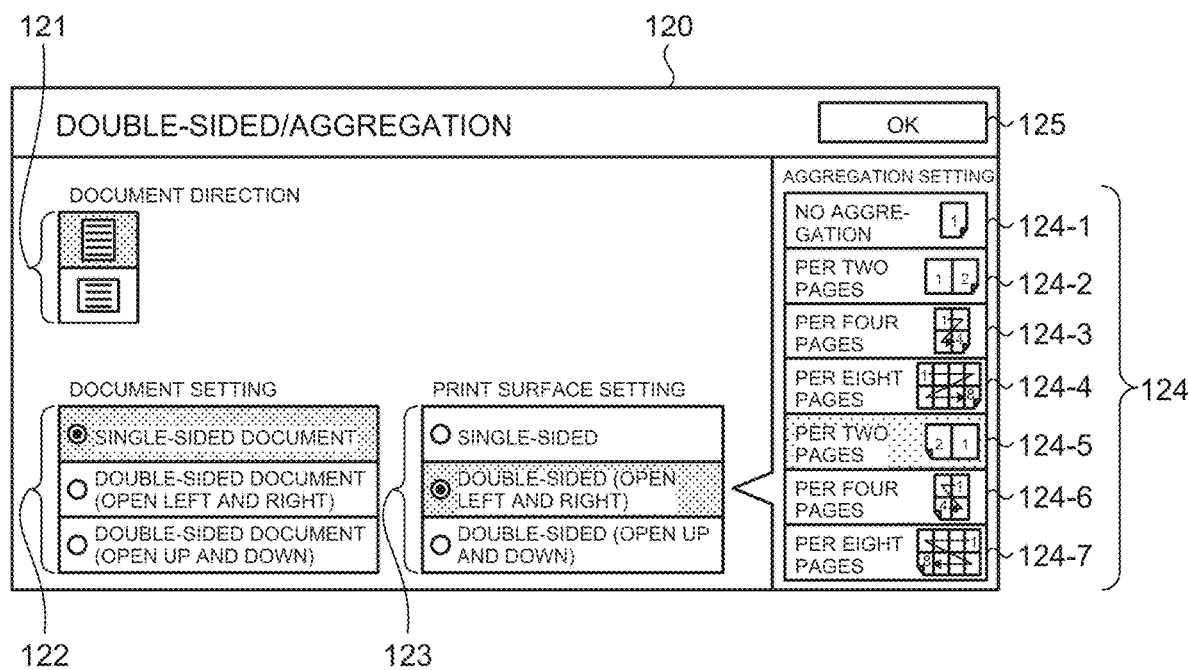
FIG. 5 is a diagram illustrating a double-sided/aggregation/division setting screen 120.

FIG. 5 is a diagram illustrating the double-sided/aggregation/division setting screen 120. As an example of the setting screen, the display control unit 22 causes the display unit 940a to display the double-sided/aggregation/division setting screen 120 as illustrated in FIG. 5.

The double-sided/aggregation/division setting screen 120 includes an original-document-direction selection button group 121. The original-document-direction selection button group 121 is a user interface for selecting whether the original document is portrait or landscape. The reception unit 24 can acquire the original document direction information, by acquiring the selected state at the original-document-direction selection button group 121.

Moreover, the double-sided/aggregation/division setting screen 120 includes an original document double-sided-printing-information selection button group 122. The original document double-sided-printing-information selection button group 122 is a user interface for selecting whether the original document is single-sided printed, double-sided printed that opens left and right, or double-sided printed that opens up and down. The reception unit 24 can acquire the original document double-sided printing information, by acquiring the selected state at the original document double-sided-printing-information selection button group 122.

Furthermore, the double-sided/aggregation/division setting screen 120 includes a double-sided printing setting button group 123. The double-sided printing setting button group 123 is option information to let the user select one of the acceptable setting values for the setting item for double-sided printing. For example, in the example in FIG. 5, the double-sided printing setting button group 123 is a user interface for selecting whether to print single-sided, print double-sided that opens left and right, or print double-sided that opens up and down. The reception unit 24 can receive the setting value for the setting item for double-sided printing, by acquiring the selected state at the double-sided printing setting button group 123.

Still furthermore, the double-sided/aggregation/division setting screen 120 includes an aggregate printing setting button group 124. The aggregate printing setting button group 124 is option information to let the user select one of the acceptable setting values for the setting item for aggregate printing. For example, in the example in FIG. 5, the aggregate printing setting button group 124 is a user interface for selecting whether to include a single image in a sheet of paper (whether not to perform aggregate printing), or a combination of aggregate number and arrangement direction of images to be included in a sheet of paper.

For example, the aggregate printing setting button group 124 includes a first button 124-1 to a seventh button 124-7. The first button 124-1 is a button for selecting to include a single image in a sheet of paper (aggregate printing will not be performed). The second button 124-2 is a button for selecting to include two images in a sheet of paper and to arrange the images in the right direction. The third button 124-3 is a button for selecting to include four images in a sheet of paper and to arrange the images in the right direction. The fourth button 124-4 is a button for selecting to include eight images in a sheet of paper and to arrange the images in the right direction. The fifth button 124-5 is a button for selecting to include two images in a sheet of paper and to arrange the images in the left direction. The sixth button 124-6 is a button for selecting to include four images in a sheet of paper and to arrange the images in the left direction. The seventh button 124-7 is a button for selecting to include eight images in a sheet of paper and to arrange the images in the left direction.

Moreover, the double-sided/aggregation/division setting screen 120 includes a confirmation button 125. The confirmation button 125 is a button for confirming the information and setting values selected in the double-sided/aggregation/division setting screen 120. When the user presses the confirmation button 125, the reception unit 24 acquires the information supplied to the double-sided/aggregation/division setting screen 120. Moreover, when the user presses the confirmation button 125, the display control unit 22 causes the display unit 940*a* to display the main setting screen 110.

Figure 6:
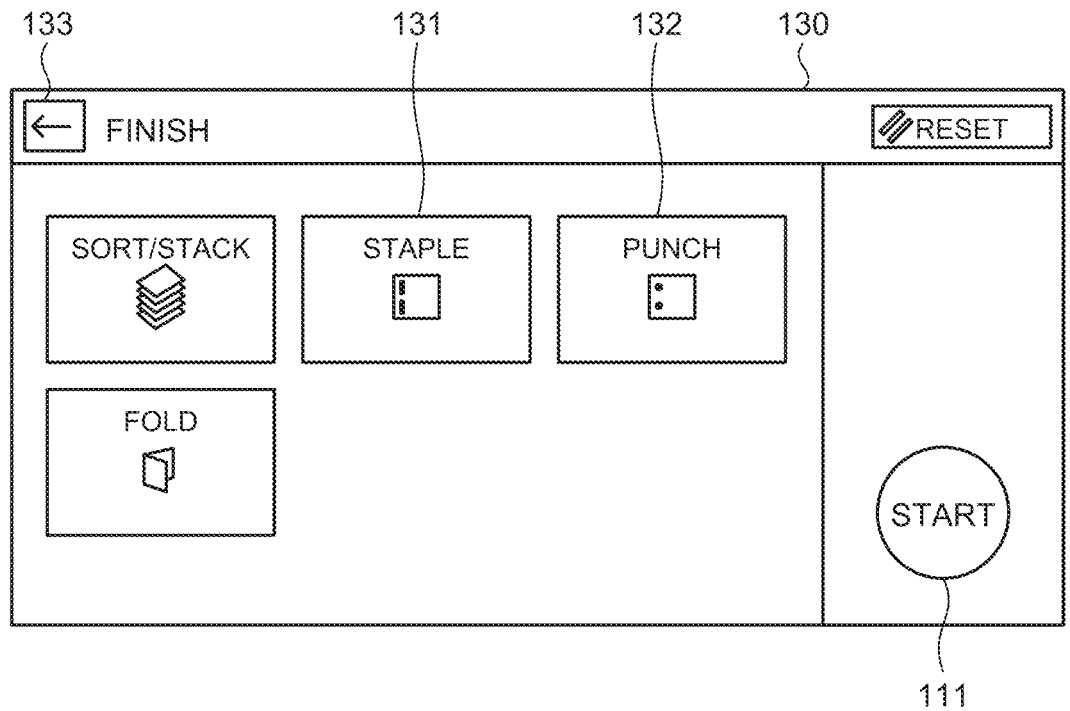
FIG. 6 is a diagram illustrating a finishing screen 130.

FIG. 6 is a diagram illustrating the finishing screen 130. As an example of the setting screen, the display control unit 22 causes the display unit 940*a* to display the finishing screen 130 as illustrated in FIG. 6.

The finishing screen 130 includes the start key button 111. The start key button 111 of the finishing screen 130 also has a function similar to that of the main setting screen 110.

Moreover, the finishing screen 130 includes a staple button 131. The staple button 131 is a button for transiting the screen to a staple setting screen 140 (details will be described in FIG. 7). When the user presses the staple button 131, the display control unit 22 causes the display unit 940*a* to display the staple setting screen 140.

Furthermore, the finishing screen 130 includes a punch button 132. The punch button 132 is a button for transiting the screen to a punch setting screen 150 (details will be described in FIG. 8). When the user presses the punch button 132, the display control unit 22 causes the display unit 940*a* to display the punch setting screen 150.

Still furthermore, the finishing screen 130 includes a Return-button within finishing screen 133. The Return-button within finishing screen 133 is a button for transiting the screen to the main setting screen 110. When the user presses the Return-button within finishing screen 133, the display control unit 22 causes the display unit 940*a* to display the main setting screen 110.

Figure 7:
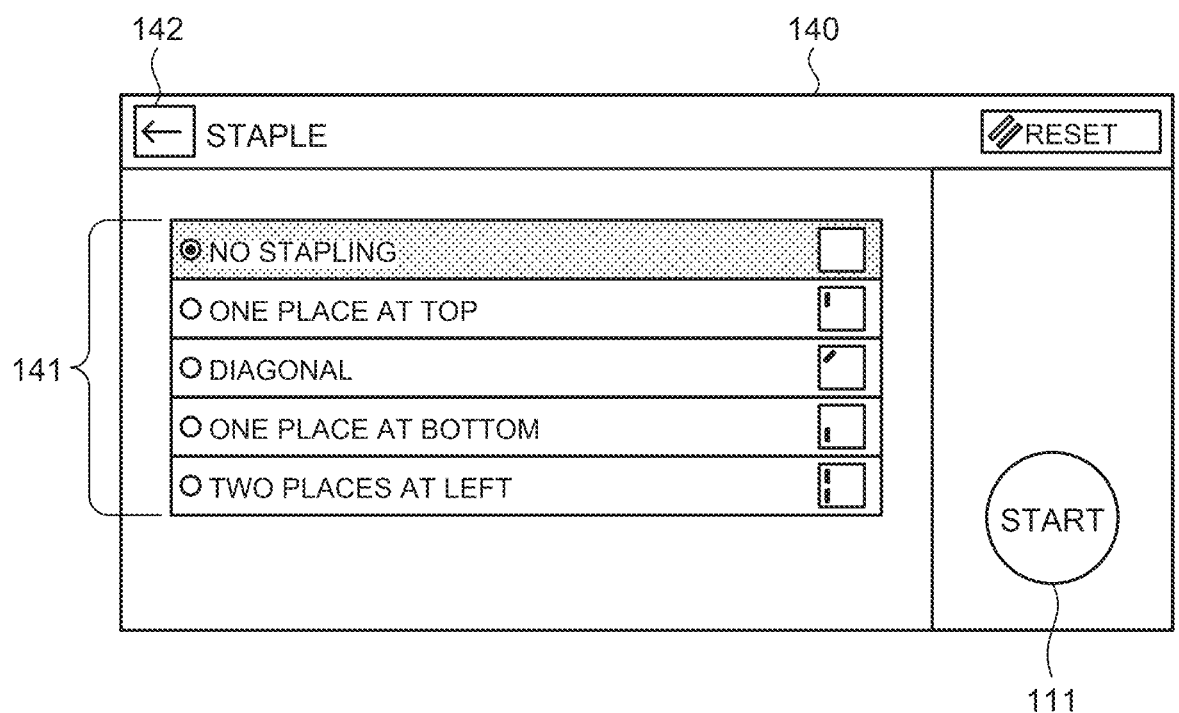
FIG. 7 is a diagram illustrating a staple setting screen 140.

FIG. 7 is a diagram illustrating the staple setting screen 140. As an example of the setting screen, the display control unit 22 causes the display unit 940*a* to display the staple setting screen 140 as illustrated in FIG. 7.

The staple setting screen 140 includes the start key button 111. The start key button 111 of the staple setting screen 140 also has a function similar to that of the main setting screen 110.

Moreover, the staple setting screen 140 includes a staple setting button group 141. The staple setting button group 141 is option information to let the user select one of the acceptable setting values for the setting item for stapling. For example, in the example in FIG. 7, the staple setting button group 141 is a user interface for selecting whether the sheets are not to be stapled together, whether one place at the top of the sheets is to be stapled together, whether the sheets are to be stapled together in a diagonal manner, whether one place at the bottom of the sheets is to be stapled together, or whether two places at the left of the sheets are to be stapled together. The reception unit 24 can receive the setting value for the setting items for stapling, by acquiring the selected state at the staple setting button group 141.

Furthermore, the staple setting screen 140 includes a Return-button within staple setting screen 142. The Return-button within staple setting screen 142 is a button for transiting the screen to the finishing screen 130. When the user presses the Return-button within staple setting screen 142, the display control unit 22 causes the display unit 940*a* to display the finishing screen 130.

Figure 8:
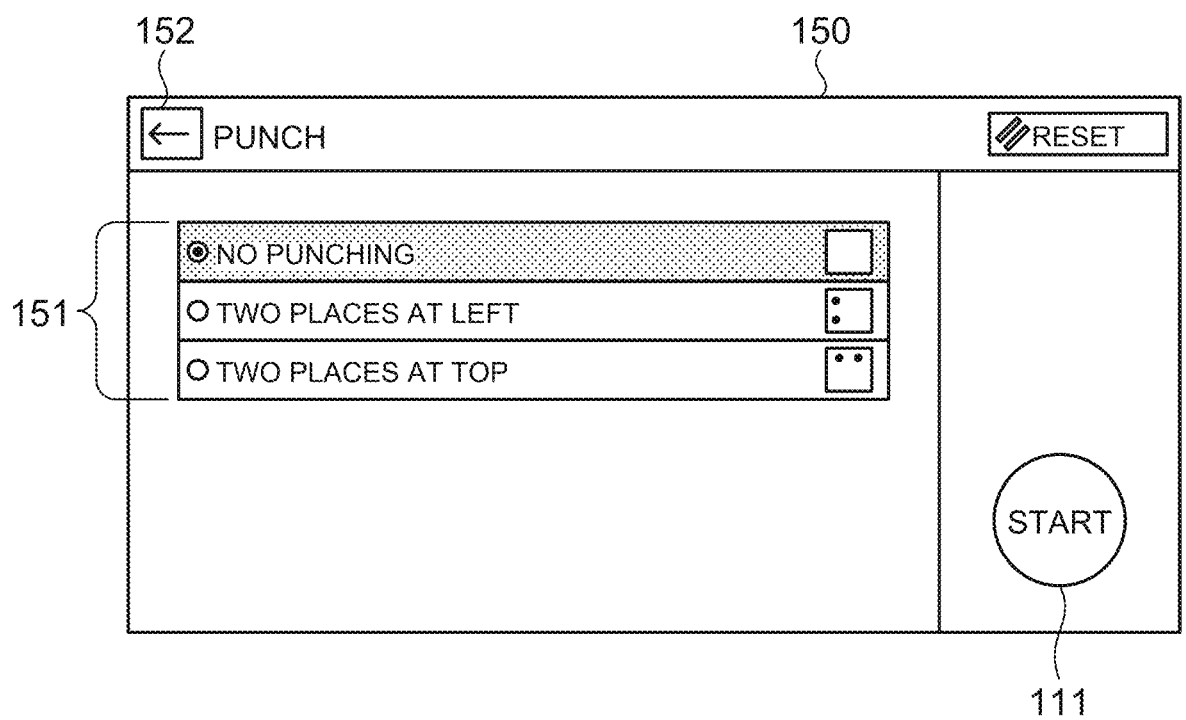
FIG. 8 is a diagram illustrating a punch setting screen 150.

FIG. 8 is a diagram illustrating the punch setting screen 150. As an example of the setting screen, the display control unit 22 causes the display unit 940*a* to display the punch setting screen 150 as illustrated in FIG. 8.

The punch setting screen 150 includes the start key button 111. The start key button 111 of the punch setting screen 150 also has a function similar to that of the main setting screen 110.

Moreover, the punch setting screen 150 includes a punch setting button group 151. The punch setting button group 151 is option information to let the user select one of the acceptable setting values for the setting item for punching. For example, in the example in FIG. 8, the punch setting button group 151 is a user interface for selecting whether the sheets are not to be punched, whether two places at the left of the sheets are to be punched and bound, or whether two places at the top of the sheets are to be punched and bound. The reception unit 24 can receive the setting value for the setting item for punching, by acquiring the selected state at the punch setting button group 151.

Furthermore, the punch setting screen 150 includes a Return-button within punch setting screen 152. The Return-button within punch setting screen 152 is a button for transiting the screen to the finishing screen 130. When the user presses the Return-button within punch setting screen 152, the display control unit 22 causes the display unit 940a to display the finishing screen 130.

Figure 9:
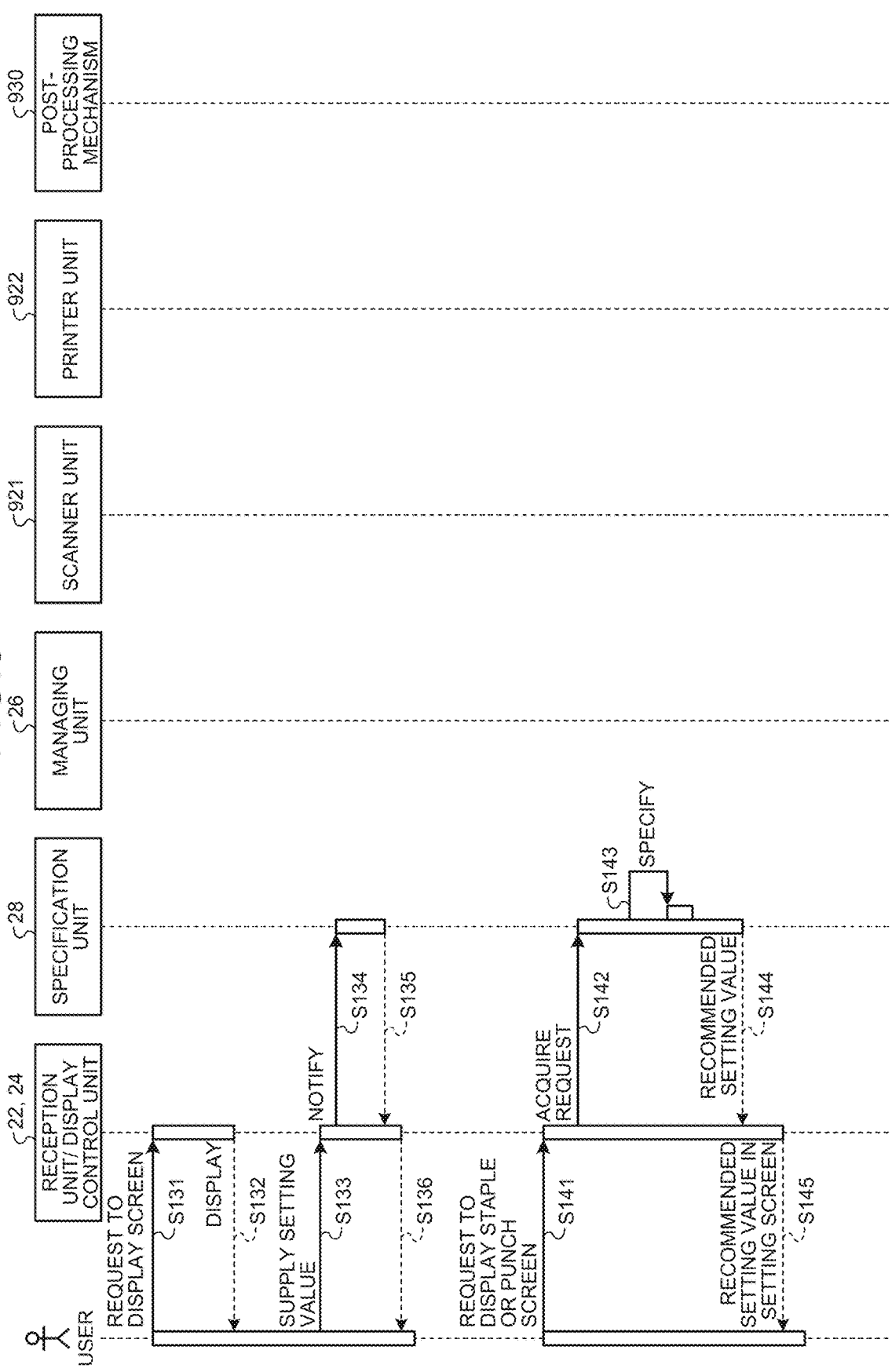
FIG. 9 is a sequence diagram illustrating a flow of display processing of a setting screen performed by the multifunction peripheral 10.

FIG. 9 is a sequence diagram illustrating a flow of display processing of a setting screen performed by the multifunction peripheral 10. When the copy function is selected, the multifunction peripheral 10 displays the setting screen in the flow illustrated in FIG. 9. First, the display control unit 22 causes the display unit 940a to display the main setting screen 110.

At S131, the user operates the operation panel 940, and presses the double-sided/aggregation/division button 112 of the main setting screen 110. Consequently, the display control unit 22 receives a request for displaying the double-sided/aggregation/division setting screen 120. Next, at S132, the display control unit 22 causes the display unit 940a to display the double-sided/aggregation/division setting screen 120.

Next, at S133, the user supplies the double-sided/aggregation/division setting screen 120 with the original document direction information, the original document double-sided printing information, the setting value for the setting item for double-sided printing, and the setting value for the setting item for aggregate printing. Then, the user confirms the supplied information, by pressing the confirmation button 125 on the double-sided/aggregation/division setting screen 120.

Next, at S134, the reception unit 24 receives the original document direction information, the original document double-sided printing information, the setting value for the setting item for double-sided printing, and the setting value for the setting item for aggregate printing. Then, the reception unit 24 notifies the specification unit 28 of the received information.

At S135, the specification unit 28 stores the notified information and supplies the reception unit 24 with response information. Next, at S136, upon receiving the response information from the specification unit 28, the reception unit 24 causes the display unit 940a to display the main setting screen 110.

Next, at S141, after receiving the setting values for the setting item for double-sided printing and the setting item for aggregate printing, the user requests to display the staple setting screen 140 or the punch setting screen 150, by operating the display unit 940a.

Upon receiving the request to display the staple setting screen 140 or the punch setting screen 150, at S142, the display control unit 22 supplies the specification unit 28 with a request for specifying the recommended setting value.

Next, at S143, on the basis of the stored original document direction information, the original document double-sided printing information, the setting value for the setting item for double-sided printing, and the setting value for the setting item for aggregate printing, the specification unit 28 specifies the recommended setting value. For example, upon receiving the request for displaying the staple setting screen 140, the specification unit 28 specifies the recommended setting value to be recommended to the user, among the acceptable setting values for the setting item for stapling. Moreover, for example, upon receiving the request for displaying the punch setting screen 150, the specification unit 28 specifies the recommended setting value to be recommended to the user, among the acceptable setting values for the setting item for punching.

Next, at S144, the specification unit 28 supplies the display control unit 22 with the specified recommended setting value. Next, at S145, the display control unit 22 displays the staple setting screen 140 or the punch setting screen 150. In this process, the display control unit 22 highlights the recommended setting value included in the option information to let the user select one of the acceptable setting values for the setting item for stapling or punching. For example, in the staple setting screen 140, the display control unit 22 highlights the recommended setting value in the staple setting button group 141. Moreover, for example, in the punch setting screen 150, the display control unit 22 highlights the recommended setting value in the punch setting button group 151.

In this manner, by highlighting the option to let the user select the recommended setting value, the display control unit 22 can let the user easily select a suitable setting value (setting value that allows the user to refer to the image without contradiction). Moreover, the user can also select the setting value other than the recommended setting value. Consequently, when the user wishes to select an unsuitable setting value, the display control unit 22 can let the user select the setting value corresponding to the user's preference.

Figure 10:
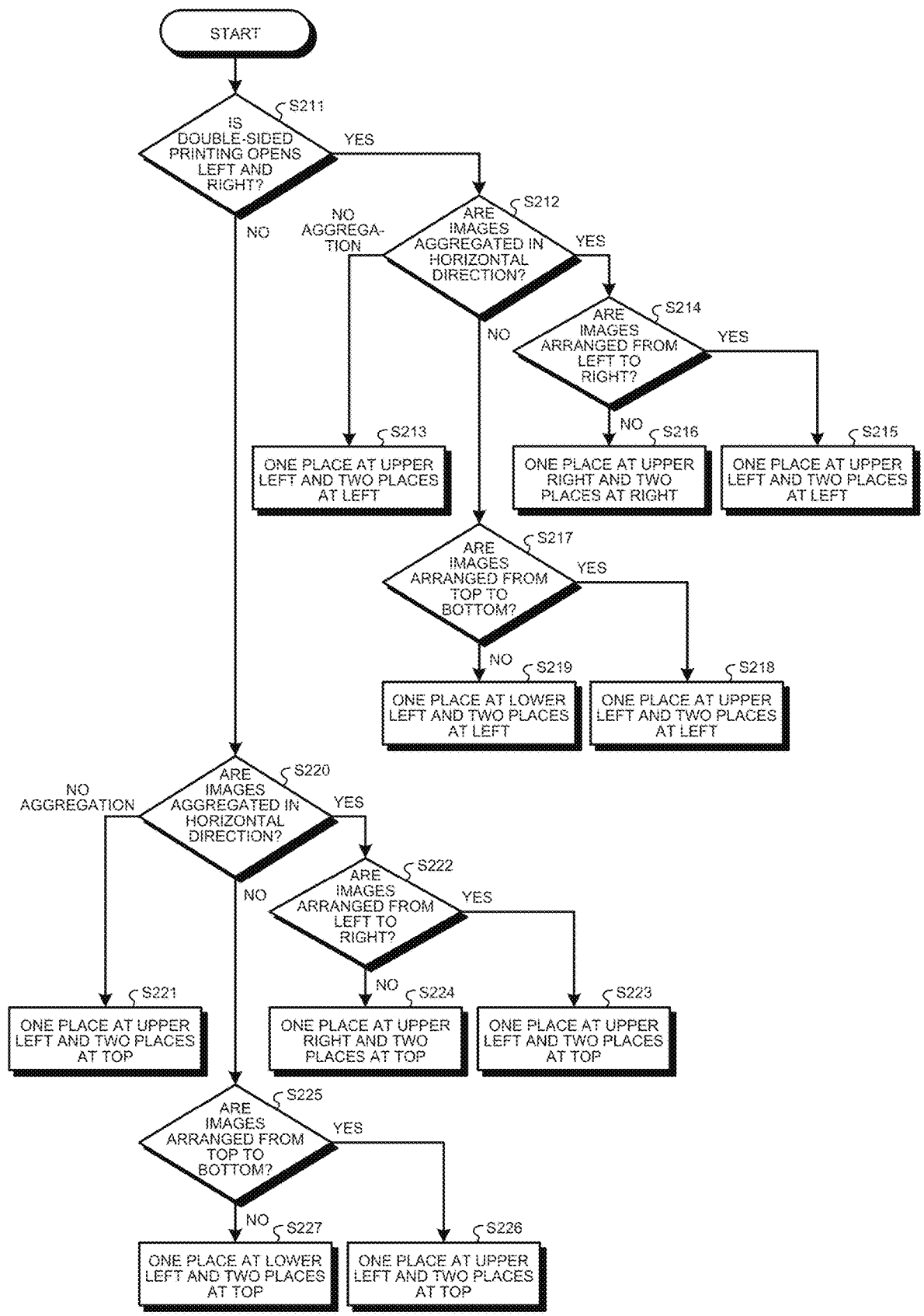
FIG. 10 is a flowchart illustrating an example of a flow of processing for specifying a recommended setting value, when a request for displaying the staple setting screen 140 is received.

FIG. 10 is a flowchart illustrating an example of a flow of processing for specifying a recommended setting value, when a request for displaying the staple setting screen 140 is received. For example, upon receiving the request for displaying the staple setting screen 140, the specification unit 28 may also specify the recommended setting value, by executing the process in FIG. 10.

First, at S211, the specification unit 28 determines whether the setting value for the setting item for double-sided printing is indicating the double-sided printing that opens left and right. When the setting value indicates the double-sided printing that opens left and right (Yes at S211), the specification unit 28 forwards the process to S212. When the setting value does not indicate the double-sided printing that opens left and right (No at S211), the specification unit 28 forwards the process to S220.

At S212, the specification unit 28 determines the setting value for the setting item for aggregate printing. When the setting value indicates that the aggregate printing will not be performed (No aggregation at S212), the specification unit 28 forwards the process to S213. At S213, the specification unit 28 specifies the recommended setting value to one place at the upper left and two places at the left. When the process at S213 is finished, the specification unit 28 finishes the present flow.

When the setting value indicates the aggregate printing in which the images are arranged in the horizontal direction (Yes at S212), the specification unit 28 forwards the process to S214. When the setting value indicates the aggregate printing in which the images are arranged in a direction other than the horizontal direction (No at S212), the specification unit 28 forwards the process to S217.

At S214, the specification unit 28 determines whether the setting value for the setting item for aggregate printing indicates whether the images are arranged from left to right. When the images are arranged from left to right (Yes at S214), the specification unit 28 forwards the process to S215. At S215, the specification unit 28 specifies the recommended setting value to one place at the upper left and two places at the left. When the images are not arranged from left to right (No at S214), the specification unit 28 forwards the process to S216. At S216, the specification unit 28 specifies the recommended setting value to one place at the upper right and two places at the right. When the process at S215 or S216 is finished, the specification unit 28 finishes the present flow.

At S217, the specification unit 28 determines whether the setting value for the setting item for aggregate printing indicates that the images are arranged from top to bottom. When the images are arranged from top to bottom (Yes at S217), the specification unit 28 forwards the process to S218. At S218, the specification unit 28 specifies the recommended setting value to one place at the upper left and two places at the left. When the images are not arranged from top to bottom, (No at S217), the specification unit 28 forwards the process to S219. At S219, the specification unit 28 specifies the recommended setting value to one place at the lower left and two places at the left. When the process at S218 or S219 is finished, the specification unit 28 finishes the present flow.

At S220, the specification unit 28 determines the setting value for the setting item for aggregate printing. When the setting value indicates that the aggregate printing will not be performed (no aggregation at S220), the specification unit 28 forwards the process to S221. At S221, the specification unit 28 specifies the recommended setting value to one place at the upper left and two places at the top. When the process at S221 is finished, the specification unit 28 finishes the present flow.

When the setting value indicates the aggregate printing in which the images are arranged horizontally (Yes at S220), the specification unit 28 forwards the process to S222. When the setting value indicates the aggregate printing in which the images are not arranged horizontally (No at S220), the specification unit 28 forwards the process to S225.

At S222, the specification unit 28 further determines whether the setting value for the setting item for aggregate printing indicates that the images are arranged from left to right. When the images are arranged from left to right (Yes at S222), the specification unit 28 forwards the process to S223. At S223, the specification unit 28 specifies the recommended setting value to one place at the upper left and two places at the top. When the images are not arranged from left to right (No at S222), the specification unit 28 forwards the process to S224. At S224, the specification unit 28 specifies the recommended setting value to one place at the upper right and two places at the top. When the process at S223 or S224 is finished, the specification unit 28 finishes the present flow.

At S225, the specification unit 28 further determines whether the setting value for the setting item for aggregate printing indicates that the images are arranged from top to bottom. When the images are arranged from top to bottom (Yes at S225), the specification unit 28 forwards the process to S226. At S226, the specification unit 28 specifies the recommended setting value to one place at the upper left and two places at the top. When the images are not arranged from top to bottom (No at S225), the specification unit 28 forwards the process to S227. At S227, the specification unit 28 specifies the recommended setting value to one place at the lower left and two places at the top. When the process at S226 or S227 is finished, the specification unit 28 finishes the present flow.

Figure 11:
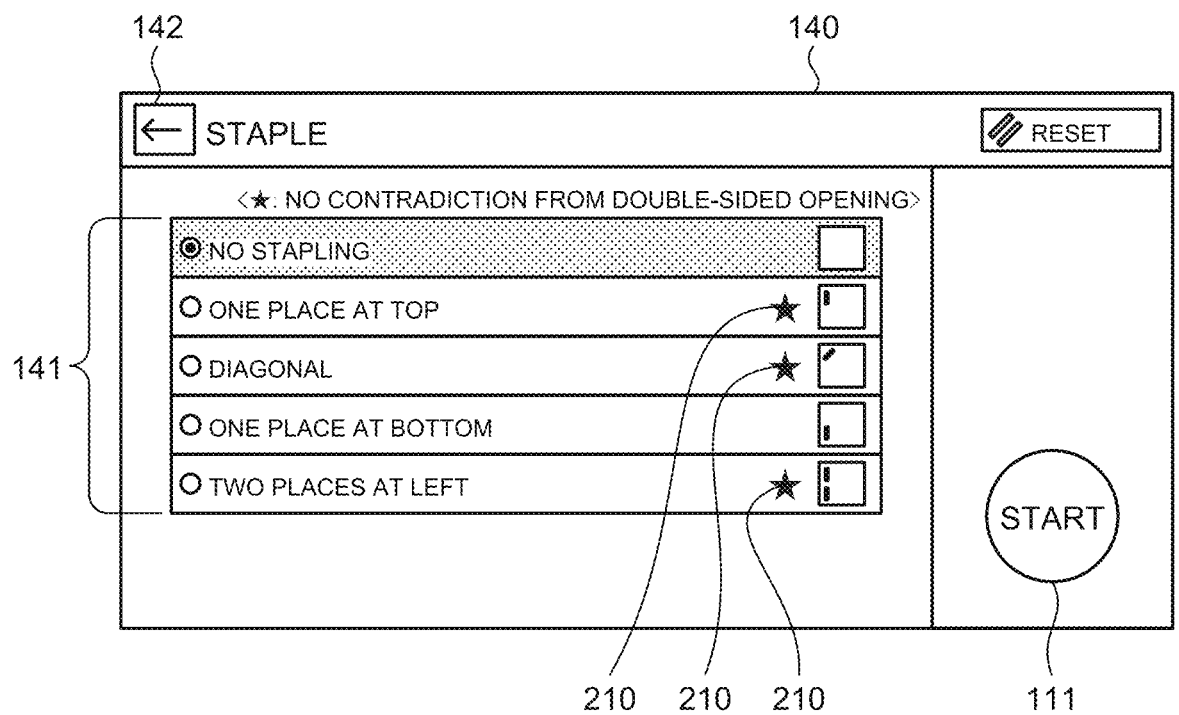
FIG. 11 is a diagram illustrating the staple setting screen 140 in which the recommended setting value is highlighted.

FIG. 11 is a diagram illustrating the staple setting screen 140 in which the recommended setting value is highlighted. The display control unit 22 causes the display unit 940a to display the staple setting screen 140 including the staple setting button group 141. The staple setting button group 141 is option information in which the acceptable setting values for the setting item for stapling are arranged in a list form. In the staple setting button group 141, one of the setting values that are arranged in a list form and that are included in the option information is selected.

Then, upon receiving the recommended setting value, the display control unit 22 highlights the button corresponding to the recommended setting value in the staple setting button group 141. For example, the display control unit 22 includes a highlight mark 210 for highlighting the button corresponding to the recommended setting value in the staple setting screen 140. Moreover, for example, the display control unit 22 may change the color or density of the button corresponding to the recommended setting value from the color or density of the other buttons. Moreover, the display control unit 22 may also change the size or shape of the button corresponding to the recommended setting value from the size or shape of the other buttons.

Figure 12:
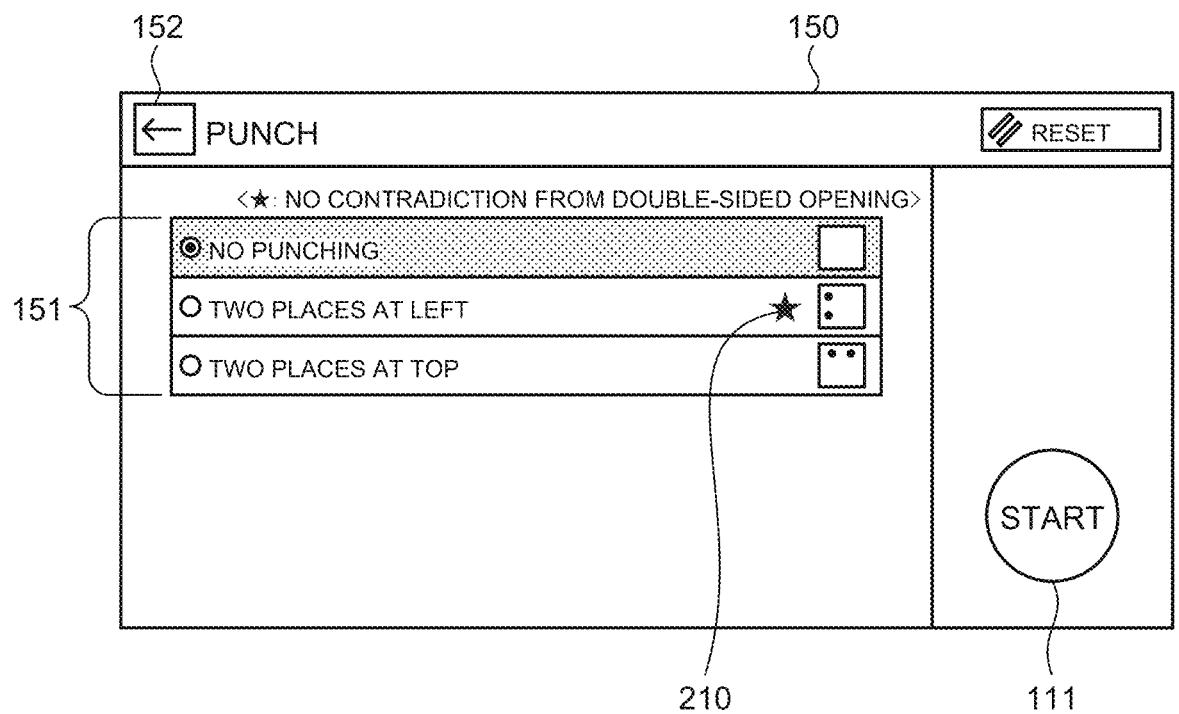
FIG. 12 is a diagram illustrating the punch setting screen 150 in which the recommended setting value is highlighted.

FIG. 12 is a diagram illustrating the punch setting screen 150 in which the recommended setting value is highlighted. The display control unit 22 causes the display unit 940a to display the punch setting screen 150 including the punch setting button group 151. The punch setting button group 151 is option information in which the acceptable setting values for the setting item for punching are arranged in a list form. In the punch setting button group 151, one of the setting values that are arranged in a list form and that are included in the option information is selected.

Then, upon receiving the recommended setting value, the display control unit 22 highlights the button corresponding to the recommended setting value in the punch setting button group 151. For example, the display control unit 22 includes the highlight mark 210 for highlighting the button corresponding to the recommended setting value in the punch setting screen 150. Moreover, for example, the display control unit 22 may change the color or density of the button corresponding to the recommended setting value from the color or density of the other buttons. Furthermore, the display control unit 22 may also change the size or shape of the button corresponding to the recommended setting value from the size or shape of the other buttons.

Figure 13:
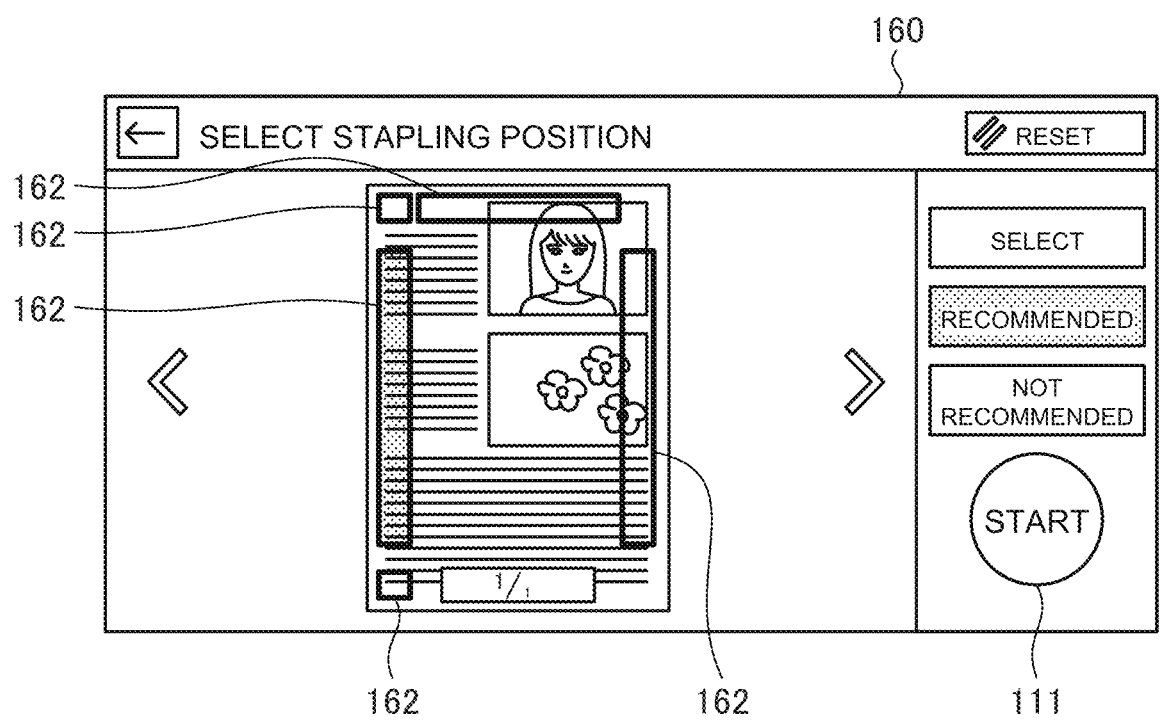
FIG. 13 is a diagram illustrating a preview screen 160 in which the recommended setting value is highlighted.

FIG. 13 is a diagram illustrating a preview screen 160 in which the recommended setting value is highlighted. As an example of the setting screen, the display control unit 22 may also cause the display unit 940a to display the preview screen 160.

The preview screen 160 includes a preview image 161 that indicates the sheet of paper after being printed, when the sheet is printed using the current setting value.

Moreover, the preview screen 160 includes a plurality of selection marks 162 at the positions corresponding to the acceptable setting values for the setting item for stapling or punching. For example, in the example in FIG. 13, the preview screen 160 includes the selection marks 162 at the positions corresponding to the top of the sheet, the upper left of the sheet, the left of the sheet, the lower left of the sheet, and the right of the sheet.

The user can select one of the selection marks 162 as the position to be stapled or to be punched. By acquiring the selected state of the selection marks 162, the reception unit 24 can receive the setting value for the setting item for stapling or punching.

Moreover, upon receiving the recommended setting value, the display control unit 22 highlights the selection mark 162 at the position corresponding to the recommended setting value, among the selection marks 162. For example, the display control unit 22 may change the color or density of the selection mark 162 at the position corresponding to the recommended setting value from the color or density of the other selection marks 162. Moreover, for example, the display control unit 22 may also change the size or shape of the selection mark 162 at the position corresponding to the recommended setting value from the size or shape of the other selection marks 162.

Figure 14:
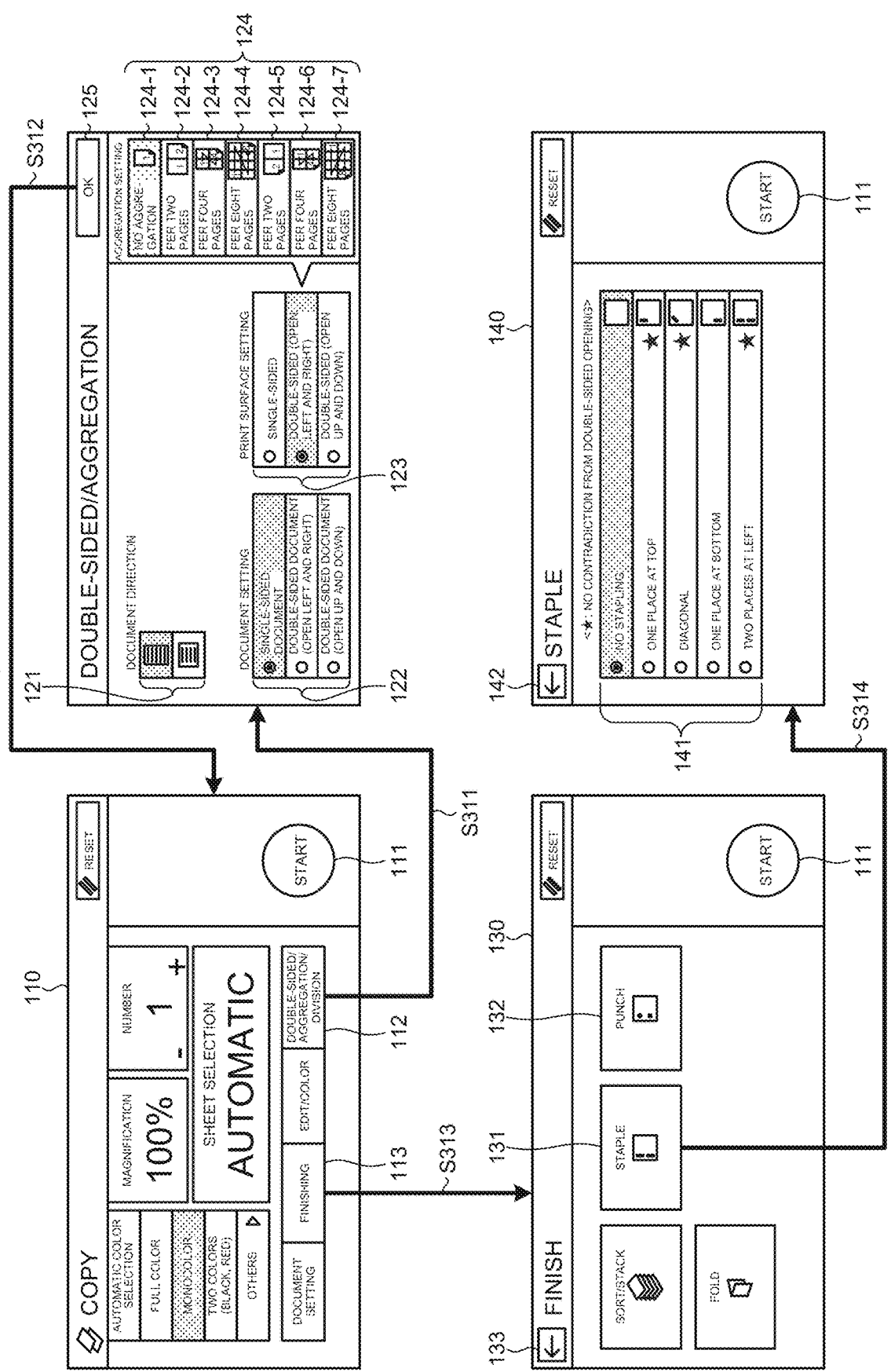
FIG. 14 is a diagram illustrating a first example of transition of a setting screen in the multifunction peripheral 10.

FIG. 14 is a diagram illustrating a first example of transition of a setting screen in the multifunction peripheral 10. For example, when the copy function is selected, the multifunction peripheral 10 transits the setting screen, in the flow illustrated in FIG. 14.

First, at S311, in the main setting screen 110, the user presses the double-sided/aggregation/division button 112. When the double-sided/aggregation/division button 112 is pressed, the display control unit 22 causes the display unit 940a to display the double-sided/aggregation/division setting screen 120.

Next, in the double-sided/aggregation/division setting screen 120, the user selects the original document direction information, the original document double-sided printing information, the setting value for the setting item for double-sided printing, and the setting value for the setting item for aggregate printing. In the first example, the user selects portrait as the original document direction information, selects the single-sided printing as the original document printing information, selects the double-sided printing that opens left and right as the setting item for double-sided printing, and selects not to perform aggregate printing as the setting item for aggregate printing.

Next, at S312, in the double-sided/aggregation/division setting screen 120, the user presses the confirmation button 125. When the confirmation button 125 is pressed, the display control unit 22 causes the display unit 940a to display the main setting screen 110.

Next, at S313, in the main setting screen 110, the user presses the finishing button 113. When the finishing button 113 is pressed, the display control unit 22 causes the display unit 940a to display the finishing screen 130.

Next, at S314, in the finishing screen 130, the user presses the staple button 131. When the staple button 131 is pressed, the display control unit 22 causes the display unit 940a to display the staple setting screen 140.

In this process, the multifunction peripheral 10 has already received the setting values for the setting item for double-sided printing and the setting item for aggregate printing. Consequently, the display control unit 22 highlights the button corresponding to the recommended setting value in the staple setting button group 141. For example, in the first example, the display control unit 22 highlights the button corresponding to the recommended setting value in the staple setting button group 141. For example, in the first example, the display control unit 22 highlights the buttons corresponding to one place at the top, in a diagonal manner, and two places at the left in the staple setting button group 141, by adding star marks.

In this manner, when the setting values for the setting item for double-sided printing and the setting item for aggregate printing are selected in advance, the display control unit 22 can highlight the recommended setting value for the setting item for stapling.

Figure 15:
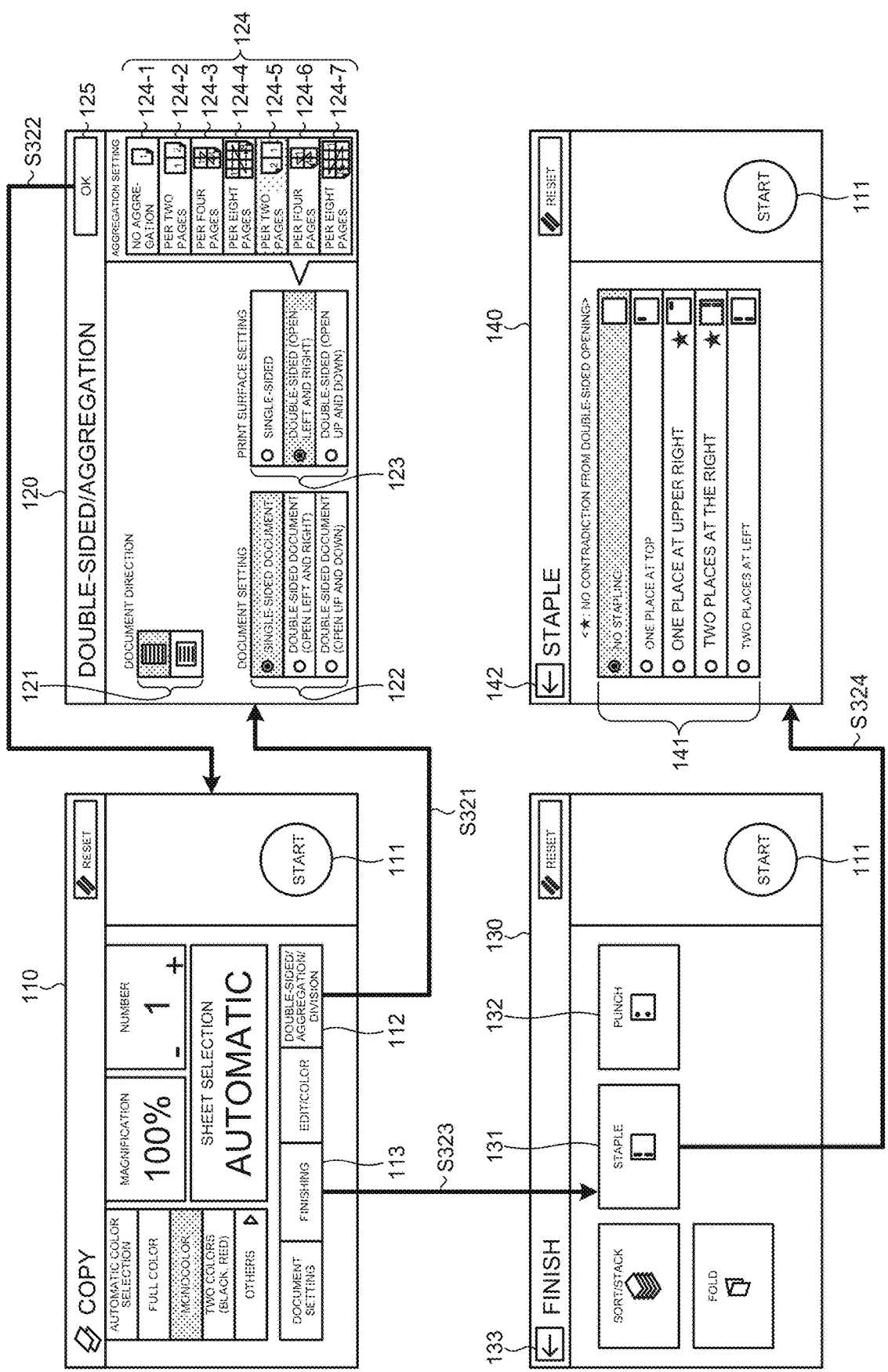
FIG. 15 is a diagram illustrating a second example of transition of the setting screen in the multifunction peripheral 10.

FIG. 15 is a diagram illustrating a second example of transition of the setting screen in the multifunction peripheral 10. For example, when the copy function is selected, the multifunction peripheral 10 transits the setting screen in the flow illustrated in FIG. 15.

First, at S321, in the main setting screen 110, the user presses the double-sided/aggregation/division button 112. When the double-sided/aggregation/division button 112 is pressed, the display control unit 22 causes the display unit 940a to display the double-sided/aggregation/division setting screen 120.

Next, in the double-sided/aggregation/division setting screen 120, the user selects the original document direction information, the original document double-sided printing information, the setting value for the setting item for double-sided printing, and the setting value for the setting item for aggregate printing. In the second example, the user selects portrait as the original document direction information, selects single-sided printing as the original document double-sided printing information, selects double-sided printing that opens left and right as the setting item for double-sided printing, and selects to include two images in a sheet of paper and to arrange and print the images in the left direction, as the setting item for aggregate printing.

Next, at S322, in the double-sided/aggregation/division setting screen 120, the user presses the confirmation button 125. When the confirmation button 125 is pressed, the display control unit 22 causes the display unit 940a to display the main setting screen 110.

Next, at S323, in the main setting screen 110, the user presses the finishing button 113. When the finishing button 113 is pressed, the display control unit 22 causes the display unit 940a to display the finishing screen 130.

Next, at S324, in the finishing screen 130, the user presses the staple button 131. When the staple button 131 is pressed, the display control unit 22 causes the display unit 940a to display the staple setting screen 140.

In this process, the multifunction peripheral 10 has already received the setting values for the setting item for double-sided printing and the setting item for aggregate printing. Consequently, the display control unit 22 highlights the button corresponding to the recommended setting value in the staple setting button group 141. For example, in the second example, the display control unit 22 highlights the buttons corresponding to two places at the right and one place at the upper right in the staple setting button group 141, by adding star marks.

In this manner, when the setting values for the setting item for double-sided printing and the setting item for aggregate printing are selected in advance, the display control unit 22 can highlight the recommended setting value for the setting item for stapling.

Figure 16:
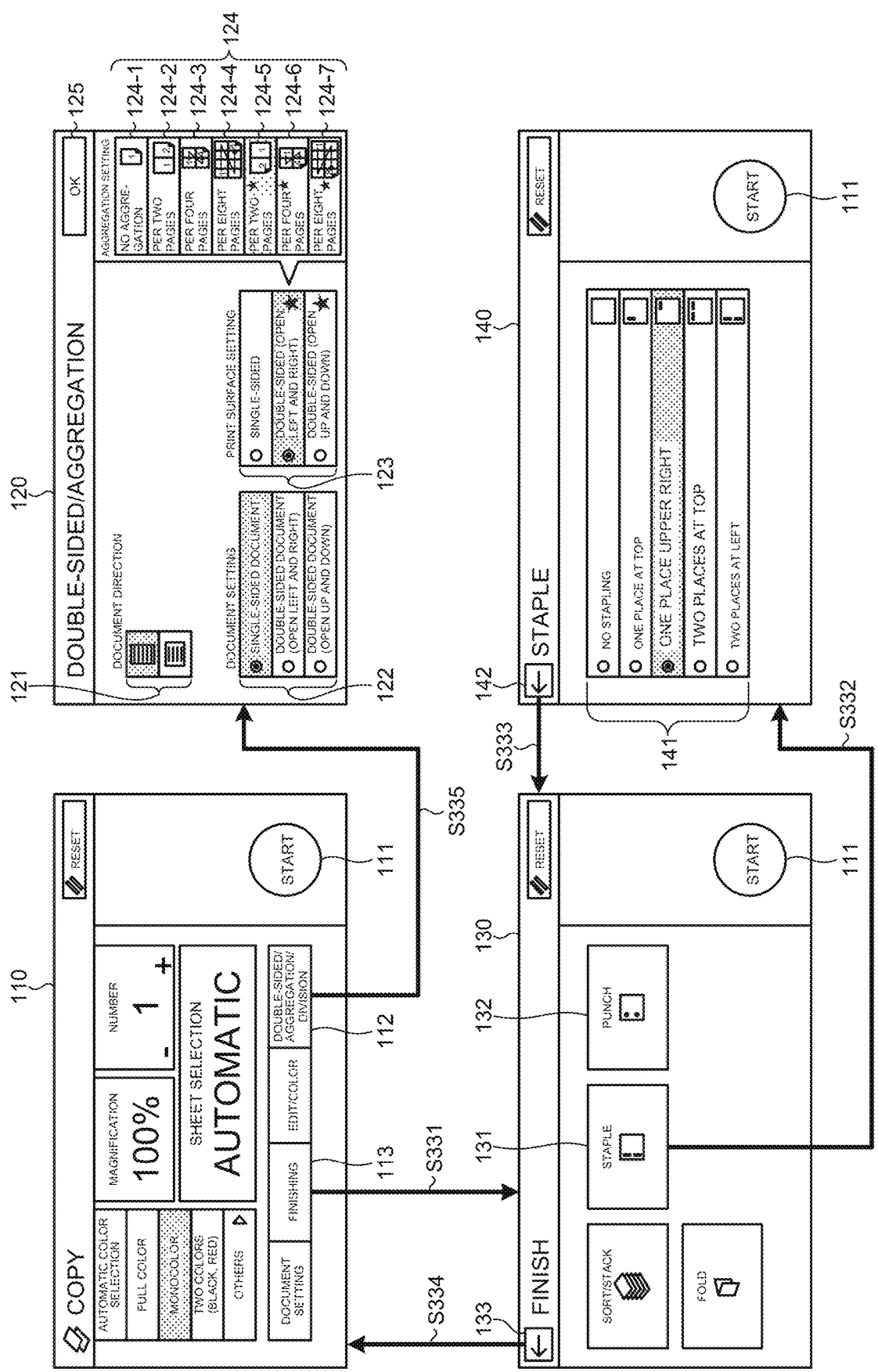
FIG. 16 is a diagram illustrating a third example of transition of the setting screen in the multifunction peripheral 10.

FIG. 16 is a diagram illustrating a third example of transition of the setting screen in the multifunction peripheral 10. For example, when the copy function is selected, the multifunction peripheral 10 transits the setting screen in the flow illustrated in FIG. 16.

Next, at S331, in the main setting screen 110, the user presses the finishing button 113. When the finishing button 113 is pressed, the display control unit 22 causes the display unit 940a to display the finishing screen 130.

Next, at S332, in the finishing screen 130, the user presses the staple button 131. When the staple button 131 is pressed, the display control unit 22 causes the display unit 940a to display the staple setting screen 140.

Next, in the staple setting screen 140, the user selects the setting value for the setting item for stapling. In the third example, the user has selected one location at the upper right.

Next, at S333, in the staple setting screen 140, the user presses the Return-button within staple setting screen 142. When the Return-button within staple setting screen 142 is pressed, the display control unit 22 causes the display unit 940a to display the finishing screen 130.

Next, at S334, in the finishing screen 130, the user presses the Return-button within finishing screen 133. When the Return-button within finishing screen 133 is pressed, the display control unit 22 causes the display unit 940a to display the main setting screen 110.

Next, at S335, in the main setting screen 110, the user presses the double-sided/aggregation/division button 112. When the double-sided/aggregation/division button 112 is pressed, the display control unit 22 causes the display unit 940a to display the double-sided/aggregation/division setting screen 120.

In this process, the multifunction peripheral 10 has already received the setting value for the setting item for stapling. Consequently, when the setting value for the setting item for double-sided printing is selected, the display control unit 22 highlights the button corresponding to the recommended setting value for the setting item for aggregate printing. On the other hand, when the setting value for the setting item for aggregate printing is selected, the display control unit 22 highlights the button corresponding to the recommended setting value for the setting item for double-sided printing.

In the third example, the display control unit 22 highlights the buttons corresponding to the double-sided printing that opens left and right and the double-sided printing that opens up and down in the double-sided printing setting button group 123, by adding star marks. Moreover, the display control unit 22 highlights the button for arranging the images in the left direction in the aggregate printing setting button group 124, by adding a star mark.

In this manner, when the setting value for the setting item for stapling is selected in advance, the display control unit 22 can highlight the recommended setting values for the setting items for double-sided printing and aggregate printing.

As described above, upon receiving the setting values for the first item and the second item from the user, the multifunction peripheral 10 according to the present embodiment specifies the recommended setting value for the third item, on the basis of the received setting values for the first item and the second item. Then, as described above, on the basis of the recommended setting value, the multifunction peripheral 10 according to the present embodiment controls the display of information for receiving the setting value for the third item included in the setting screen. Consequently, as described above, with the multifunction peripheral 10 according to the present embodiment, it is possible to let the user easily select a suitable setting value for the third item, after receiving the setting values for the first item and the second item. Moreover, with the multifunction peripheral according to the present embodiment, the user can select the setting value other than the recommended setting value. Consequently, when the user wishes to select an unsuitable setting value, the user can select the setting value corresponding to the user's preference. In this manner, with the multifunction peripheral 10 according to the present embodiment, it is possible to reduce the user's burden.

The computer program executed by the controller 910 of the multifunction peripheral 10 is incorporated in the read-only memory (ROM) and the like, in advance.

The computer program executed by the controller 910 of the multifunction peripheral 10 may be recorded in a computer-readable recording medium such as a compact disc-read only memory (CD-ROM), a flexible disk (FD), a compact disc-recordable (CD-R), and a digital versatile disc (DVD) in an installable or executable file format.

Moreover, the computer program executed by the controller 910 of the multifunction peripheral 10 may also be stored on a computer connected to a network such as the Internet, and provided by being downloaded over the network. Furthermore, the computer program executed by the controller 910 of the multifunction peripheral 10 may be provided or distributed over the network such as the Internet.

The computer program executed by the controller 910 of the multifunction peripheral 10 has a modular configuration including the units described above (display control module, reception module, and specification module). As actual hardware, when the CPU (hardware processor) reads out the computer program from the ROM described above and executes the computer program, the units described above are loaded on the main storage device, and the display control unit 22, the reception unit 24, and the specification unit 28 will be generated on the main storage device.

While the embodiments of the present invention have been described, the embodiments are merely examples, and are not intended to limit the scope of the invention. These novel embodiments may be implemented in various other forms.

With the present invention, it is possible to reduce the burden of the user.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
a memory; and
a hardware processor coupled to the memory and configured to:
cause a display device to display a setting screen for receiving individual setting values for a plurality of setting items;
receive, from a user, individual setting values for a first item, a second item, and a third item in the setting items through the setting screen;
specify a recommended setting value for the third item, based on the received setting values for the first item and the second item;
include option information into the setting screen as the information for receiving the setting value for the third item, the option information being information to let the user select one of a plurality of the setting values acceptable for the third item; and
highlight, upon receiving the setting values for the first item and the second item, an option to let the user select the recommended setting value from among the plurality of the setting values acceptable for the third item included in the option information; and
control, upon receiving the setting values for the first item and the second item from the user, display of information for receiving a setting value for the third item included in the setting screen based on the recommended setting value,
wherein
the option information includes a preview image representing a sheet of paper after being printed; and a plurality of selection marks at positions corresponding to the plurality of setting values acceptable for the third item in the preview image, and
the hardware processor is configured to highlight a selection mark, among the selection marks, at a position corresponding to the recommended setting value.

2. The image forming apparatus according to claim 1, wherein
the option information includes the plurality of setting values that are acceptable for the third item and are arranged in a list form from which one of the setting values is selected, and
the hardware processor is configured to highlight the recommended setting value included in the option information.

3. The image forming apparatus according to claim 1, wherein the hardware processor is configured to:
receive original document information relating to an original document, from the user through the setting screen; and
specify the recommended setting value based on the original document information.

4. The image forming apparatus according to claim 1, wherein
the first item and the second item are a setting item for double-sided printing and a setting item for aggregate printing, and
the third item is a setting item for stapling or punching.

5. The image forming apparatus according to claim 4, wherein the hardware processor is configured to specify, as the recommended setting value for the setting item for stapling or punching, a position at which an image is referable in a page order of an original document when sheets of paper printed using the received setting value are bound together, the specification of the position being executed based on the setting value for the setting item for double-sided printing and the setting value for the setting item for aggregate printing.

6. The image forming apparatus according to claim 1, wherein
the first item and the second item are a setting item for stapling or punching and a setting item for double-sided printing, and
the third item is a setting item for aggregate printing.

7. The image forming apparatus according to claim 6, wherein the hardware processor is configured to specify, as the recommended setting value for the setting item for aggregate printing, a combination of aggregate number and arrangement direction with which an image is referable in a page order of an original document when sheets of paper printed using the received setting value are bound together, the specification of the combination being executed based on the setting value for the setting item for stapling or punching and the setting value for the setting item for double-sided printing.

8. The image forming apparatus according to claim 1, wherein
the first item and the second item are a setting item for stapling or punching and a setting item for aggregate printing, and
the third item is a setting item for double-sided printing.

9. The image forming apparatus according to claim 8, wherein the hardware processor is configured to specify, as the recommended setting value for the setting item for double-sided printing, a direction of double-sided opening with which an image is referable in a page order of an original document when sheets of paper printed using the received setting value are bound together, the specification of the direction of double-sided opening being executed based on the setting value for the setting item for stapling or punching and the setting value for the setting item for aggregate printing.

10. The image forming apparatus according to claim 1, further comprising a printer that forms an image on a sheet of paper based on the setting value set for each of the setting items.

11. The image forming apparatus according to claim 1, wherein the hardware processor is configured to specify, as the recommended setting value for the third item, a setting value at which an image is referable in a page order of an original document when sheets of paper printed using the received setting value are bound together, the specification of the third item being executed based on the setting value for the setting item for first item and the setting value for the setting item for second item.

12. The image forming apparatus according to claim 1, wherein each of the plurality of the setting values acceptable for the third item is configured to be displayed including a preview image of a sheet of paper including marks illustrating a location of the respective one of the plurality of the setting values acceptable for the third item on a sheet of paper.

13. An information processing method implemented by a computer, the method comprising:
   causing a display device to display a setting screen for receiving individual setting values for a plurality of setting items;
   receiving, from a user, individual setting values for a first item, a second item, and a third item in the setting items through the setting screen;
   specifying a recommended setting value for the third item, based on the received setting values for the first item and the second item;
   including option information into the setting screen as the information for receiving the setting value for the third item, the option information being information to let the user select one of a plurality of the setting values acceptable for the third item; and
   highlighting, upon receiving the setting values for the first item and the second item, an option to let the user select the recommended setting value from among the plurality of the setting values acceptable for the third item included in the option information; and
   controlling, upon receiving the setting values for the first item and the second item from the user, display of information for receiving a setting value for the third item included in the setting screen based on the recommended setting value,
   wherein the option information includes a preview image representing a sheet of paper after being printed; and a plurality of selection marks at positions corresponding to the plurality of setting values acceptable for the third item in the preview image, and
   highlighting a selection mark, among the selection marks, at a position corresponding to the recommended setting value.

14. A non-transitory computer-readable recording medium on which an executable program is recorded, the program instructing a computer to:
   cause a display device to display a setting screen for receiving individual setting values for a plurality of setting items;
   receive, from a user, individual setting values for a first item, a second item, and a third item in the setting items through the setting screen;
   specify a recommended setting value for the third item, based on the received setting values for the first item and the second item;
   include option information into the setting screen as the information for receiving the setting value for the third item, the option information being information to let the user select one of a plurality of the setting values acceptable for the third item; and
   highlight, upon receiving the setting values for the first item and the second item, an option to let the user select the recommended setting value from among the plurality of the setting values acceptable for the third item included in the option information; and
   control, upon receiving the setting values for the first item and the second item from the user, display of information for receiving a setting value for the third item included in the setting screen based on the recommended setting value,
   wherein the option information includes a preview image representing a sheet of paper after being printed; and a plurality of selection marks at positions corresponding to the plurality of setting values acceptable for the third item in the preview image, and
   highlighting a selection mark, among the selection marks, at a position corresponding to the recommended setting value.

* * * * *